(12) United States Patent
Chang et al.

(10) Patent No.: US 9,377,355 B2
(45) Date of Patent: Jun. 28, 2016

(54) OPTICAL SENSOR APPARATUS AND IMAGE SENSING APPARATUS INTEGRATING MULTIPLE FUNCTIONS

(71) Applicant: EMINENT ELECTRONIC TECHNOLOGY CORP. LTD., Hsinchu (TW)

(72) Inventors: Tom Chang, Taipei (TW); Kao-Pin Wu, New Taipei (TW); Shang-Ming Hung, Hsinchu County (TW); Chih-Jen Fang, Tainan (TW); Cheng-Ta Chuang, New Taipei (TW)

(73) Assignee: EMINENT ELECTRONIC TECHNOLOGY CORP. LTD., Hsinchu Science Park, Hsinchu (TW)

( * ) Notice: Subject to any disclaimer, the term of this patent is extended or adjusted under 35 U.S.C. 154(b) by 319 days.

(21) Appl. No.: 14/182,305

(22) Filed: Feb. 18, 2014

(65) Prior Publication Data

US 2014/0231625 A1   Aug. 21, 2014

Related U.S. Application Data

(60) Provisional application No. 61/765,815, filed on Feb. 18, 2013.

(30) Foreign Application Priority Data

Feb. 13, 2014  (TW) ................ 103104777 A

(51) Int. Cl.
| | |
|---|---|
| G06F 3/01 | (2006.01) |
| G01J 1/44 | (2006.01) |
| G01J 1/42 | (2006.01) |
| H04N 21/422 | (2011.01) |
| H04N 21/431 | (2011.01) |
| H04N 5/58 | (2006.01) |

(52) U.S. Cl.
CPC ............. *G01J 1/44* (2013.01); *G01J 1/4204* (2013.01); *G06F 3/017* (2013.01); *H04N 21/42202* (2013.01); *H04N 21/4318* (2013.01); *H04N 5/58* (2013.01)

(58) Field of Classification Search
CPC .................................. G06F 3/01; G06F 3/017
See application file for complete search history.

(56) References Cited

U.S. PATENT DOCUMENTS

| | | | | |
|---|---|---|---|---|
| 5,763,872 | A * | 6/1998 | Ness ................. | F21S 9/022 |
| | | | | 250/214 AL |
| 9,063,574 | B1 * | 6/2015 | Ivanchenko ........... | G06F 3/017 |
| 2012/0200486 | A1 | 8/2012 | Meinel | |
| 2012/0274745 | A1 | 11/2012 | Russell | |
| 2015/0301175 | A1 * | 10/2015 | Rao .................. | G01S 17/026 |
| | | | | 701/49 |

FOREIGN PATENT DOCUMENTS

| | | |
|---|---|---|
| CA | 2 728 592 A1 | 8/2011 |
| TW | 200903792 | 1/2009 |

\* cited by examiner

*Primary Examiner* — Tony Ko
(74) *Attorney, Agent, or Firm* — Winston Hsu; Scott Margo

(57) ABSTRACT

An optical sensor apparatus includes an infrared light generating device, N first detection devices, a second detection device and a processing circuit. In addition to detecting infrared light, the N first detection devices further detect N different visible wavelength ranges, respectively. The second detection device is optically shielded from visible light and arranged for detecting infrared light. In a first sensing mode, the processing circuit obtains color information according to N first detection signals generated by the N first detection devices and a reference signal generated by the second detection device. In a second sensing mode, the N first detection devices and the second detection device generate (N+1) second detection signals when the infrared light generating device is activated, and generate (N+1) third detection signals when the infrared light generating device is deactivated. The processing circuit recognizes gesture information according to the (N+1) second and the (N+1) third detection signals.

20 Claims, 20 Drawing Sheets

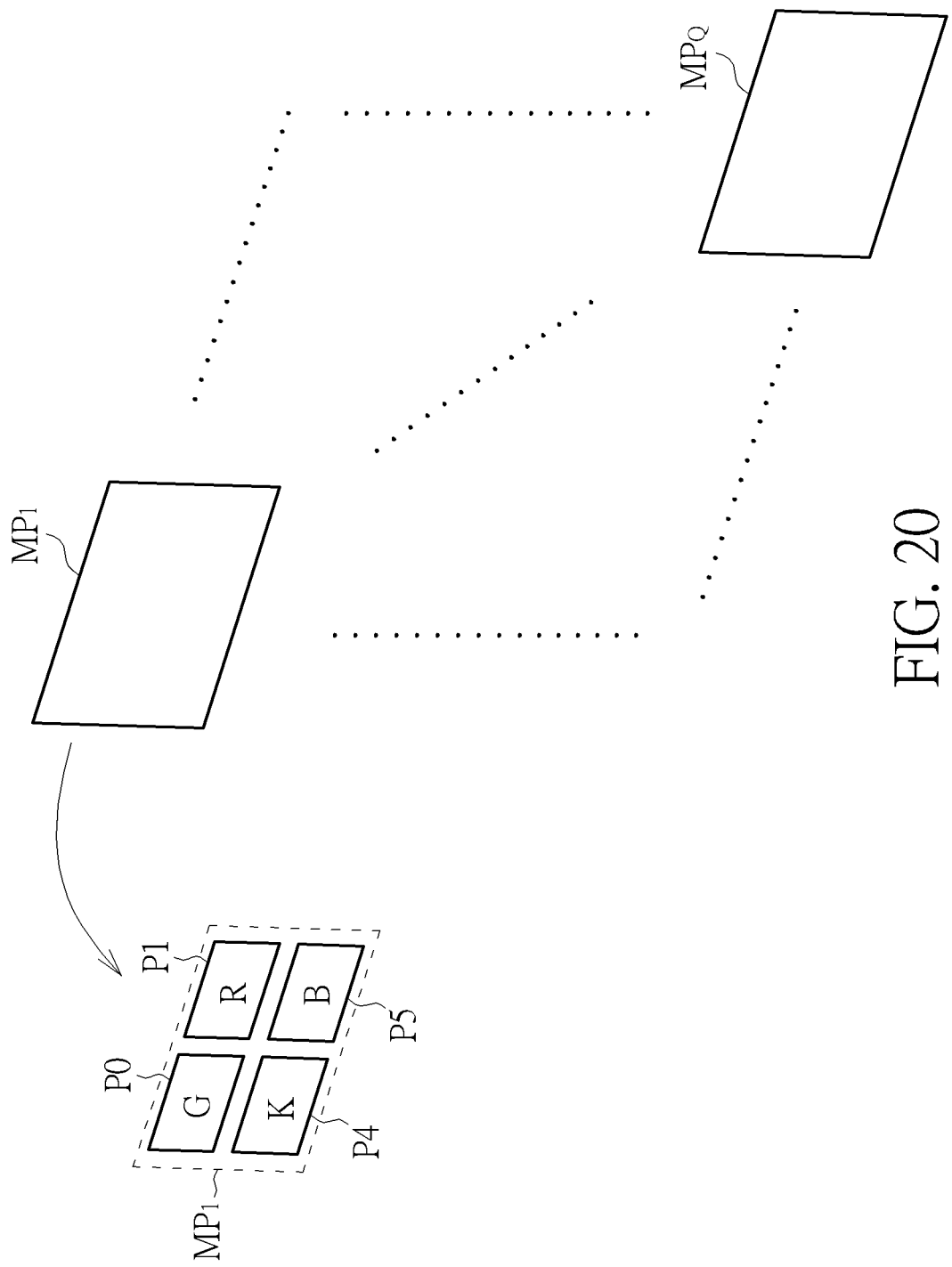

OPTICAL SENSOR APPARATUS AND IMAGE SENSING APPARATUS INTEGRATING MULTIPLE FUNCTIONS

CROSS REFERENCE TO RELATED APPLICATIONS

This application also claims the benefit of U.S. provisional application No. 61/765,815, filed on Feb. 18, 2013, the contents of which are incorporated herein by reference.

BACKGROUND OF THE INVENTION

1. Field of the Invention

The disclosed embodiments of the present invention relate to optical sensing, and more particularly, to an optical sensor apparatus which integrates multiple functions into a detection device thereof.

2. Description of the Prior Art

As the mobile apparatuses continue to improve user interfaces, users may enjoy more user-friendly experiences. An optical sensor is one of primary devices used in a mobile apparatus and provides ambient light and proximity sensing functions. In order to provide better display rendition and color balance (e.g. weightings of red, green, blue), the mobile apparatus also needs an ambient color sensing function or a color temperature sensing function.

In addition, the mobile apparatus may further have hand gesture recognition capability added to a touch screen function (i.e. a non-contact gesture recognition function), which can help the user interact with the mobile apparatus when driving or when the user's hands are tied up with foods or dirty repair parts. However, the added functions may increase the total cost or require more space. Both space and cost increases are not desirable in the mobile apparatus.

Thus, there is a need for an integrated low cost design to solve the above problems.

SUMMARY OF THE INVENTION

It is therefore one objective of the present invention to provide an optical sensor apparatus which integrates multiple functions into a detection device thereof to solve the above problems.

It is therefore another objective of the present invention to provide an image sensing apparatus which integrates multiple functions into a detection device thereof to realize a three-dimensional (3D) image sensing apparatus having color sensing, ambient light sensing, gesture recognition, proximity sensing, image sensing and/or depth information sensing functions.

According to an embodiment of the present invention, an exemplary optical sensor apparatus is disclosed. The exemplary optical sensor apparatus comprises an infrared light generating device, N first detection devices, a second detection device and a processing circuit, wherein N is a positive integer. Each of the N first detection devices is arranged for detecting infrared light and visible light, and the N first detection devices are arranged for detecting N different visible wavelength ranges, respectively. The second detection device is arranged for detecting the infrared light, wherein the second detection device is optically shielded from the visible light. The processing circuit is coupled to the N first detection devices and the second detection device. In a first sensing mode, the N first detection devices generate N first detection signals in response to light coming from an object, the second detection device generates a reference signal in response to the light coming from the object, and the processing circuit obtains color information according to the N first detection signals and the reference signal. In a second sensing mode, the N first detection devices and the second detection device generate (N+1) second detection signals by detecting light coming from the object when the infrared light generating device is activated, the N first detection devices and the second detection device generate (N+1) third detection signals by detecting light coming from the object when the infrared light generating device is deactivated, and the processing circuit recognizes gesture information according to the (N+1) second detection signals and the (N+1) third detection signals.

According to an embodiment of the present invention, an exemplary image sensing apparatus is disclosed. The exemplary image sensing apparatus comprises an infrared light generating device, a plurality of main pixels and a processing circuit. Each of the main pixels comprises N first sub-pixels and a second sub-pixel, wherein N is a positive integer. Each of the N first sub-pixels is arranged for detecting infrared light and visible light, and the N first sub-pixels are arranged for detecting N different visible wavelength ranges, respectively. The second sub-pixel is arranged for detecting the infrared light, wherein the second sub-pixel is optically shielded from the visible light. The processing circuit is coupled to the main pixels. In a first sensing mode, the N first sub-pixels of each main pixel generate N first detection signals in response to light coming from an object, the second sub-pixel of each main pixel generates a reference signal in response to the light coming from the object, and the processing circuit obtains image information according to the N first detection signals of each main pixel and the reference signal generated by the second sub-pixel corresponding to the N first detection signals of each main pixel. In a second sensing mode, each main pixel generates a second detection signal by detecting light coming from the object when the infrared light generating device is activated, each main pixel generates a third detection signal by detecting light coming from the object when the infrared light generating device is deactivated, and the processing circuit recognizes depth information according to the second detection signal and the third detection signal of each main pixel.

The proposed optical sensor apparatus and/or image sensing apparatus may be employed in a variety of electronic apparatuses (e.g. a mobile apparatus, a notebook personal computer (PC) and/or an all-in-one PC). The proposed optical sensing mechanism may employ four detection devices only to realize ambient light sensing, proximity sensing, color sensing and gesture recognition functions, thus greatly reducing production costs. The proposed optical sensing mechanism may be further employed in a pixel array to thereby realize a multi-function 3D image sensing apparatus.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 20 is an implementation of a pixel layout of the image sensing apparatus shown in FIG. 19 in different sensing modes.

DETAILED DESCRIPTION

The proposed optical sensing mechanism may integrate a plurality of detection devices (e.g. a photodetector/pixel) into a single optical sensor apparatus, and utilize color spectrum coating (and/or filter design) and related algorithm to implement a dual function detection device (e.g. a multi-purpose photodetectors which work in dual modes), thereby reducing the number of detection devices required. To facilitate an understanding of the present invention, exemplary implementations of an optical sensor apparatus having multiple detection devices integrated therein are given in the following for further description.

Figure 1:
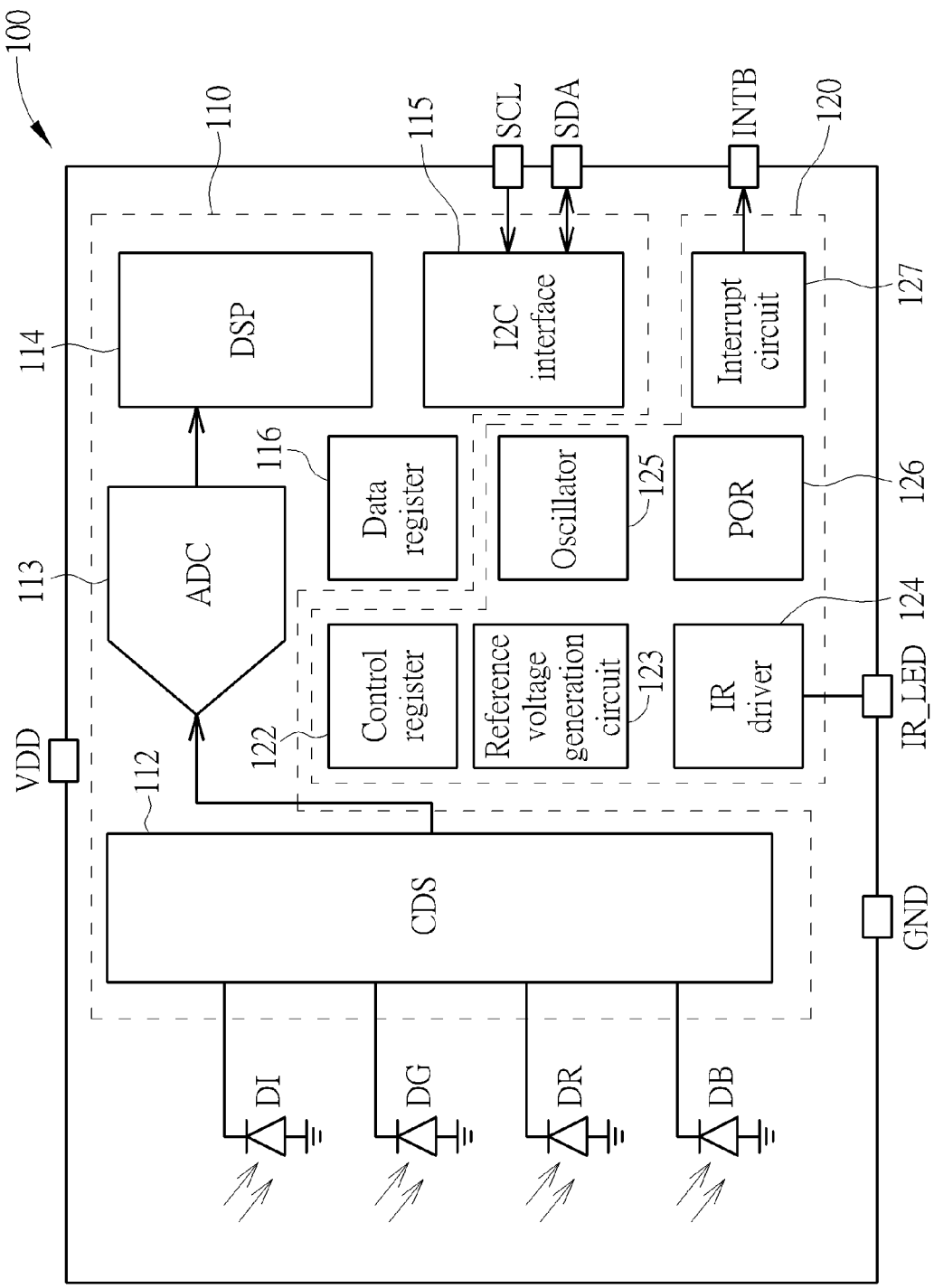
FIG. 1 is a diagram illustrating an exemplary optical sensor apparatus according to an embodiment of the present invention.

Please refer to FIG. 1, which is a diagram illustrating an exemplary optical sensor apparatus according to an embodiment of the present invention. In this embodiment, the optical sensor apparatus 100 may include a plurality of detection devices to implement color sensing, wherein the detection devices may include a plurality of photodetectors DI, DG, DR and DB. The photodetectors DI, DG, DR and DB may be at least a portion of an infrared (IR) light sensing pixel, at least a portion of a green light sensing pixel, at least a portion of a red light sensing pixel and at least a portion of a blue light sensing pixel, respectively (the IR, green, red and blue sensing pixels are not shown in FIG. 1). The photodetectors DI, DG, DR and DB may be arranged for detecting IR light, green light, red light and blue light, respectively. The optical sensor apparatus 100 may further include a processing 110 and a control circuit 120. The processing circuit 110 may be used to process detection signals (e.g. electrical signals) generated from the photodetectors DI, DG, DR and DB to obtain ambient color information or color information of an object. The control circuit 120 may be used to control sensing operations of the sensing pixels and signal processing of the processing circuit 110.

The optical sensor apparatus 100 may use the photodetector DI to detect IR light in the environment to obtain/determine information about a light source in the environment, thereby improving the accuracy of color sensing. For example, when obtaining the information about the light source according to a detection signal generated from the photodetector DI, the processing circuit 110 may adjust detection signals corresponding to the photodetectors DG, DR and DB according to the obtained information about the light source, thereby obtaining truer color information.

In practice, the processing circuit 110 may include, but is not limited to, a correlated double sampling circuit (CDS) 112, an analog-to-digital converter (ADC) 113, a digital signal processing (DSP) circuit 114 (labeled "DSP"), an inter-integrated circuit interface (I2C interface) 115 and a data register 116. The CDS 112 may sample the detection signals generated by the photodetectors DI, DG, DR and DB, the ADC 113 may perform an analog-to-digital conversion upon sampling results of the CDS 112, the DSP circuit 114 may process conversion results of the ADC 113, and the data register 116 may store processed data. The I2C interface 115 may be used for communication and data transmission between chips, and coupled to a pad SCL corresponding to a serial clock line (SCL) (not shown in FIG. 1) and a pad SDA corresponding to a serial data line (SDA) (not shown in FIG. 1). As a person skilled in the art should understand operations of each circuit element included in the processing circuit 110, further description is omitted here for brevity.

In this embodiment, the control circuit 120 may include, but is not limited to, a control register 122, a reference voltage generation circuit 123, an infrared (IR) light emitting diode (LED) driver 124 (labeled "IR driver"), an oscillator 125, a power-on reset (POR) circuit 126 (labeled "POR") and an interrupt circuit 127. The IR LED driver 124 may control an IR LED (not shown in FIG. 1) through a pad IR_LED, and the interrupt circuit 127 may receive an interrupt signal (not shown in FIG. 1) from a pad INTB. A pad VDD is coupled to a power supply (not shown in FIG. 1), and a pad GND is coupled to a ground voltage (not shown in FIG. 1). As a person skilled in the art should understand operations of each circuit element included in the control circuit 120, further description is omitted here for brevity.

Figure 2:
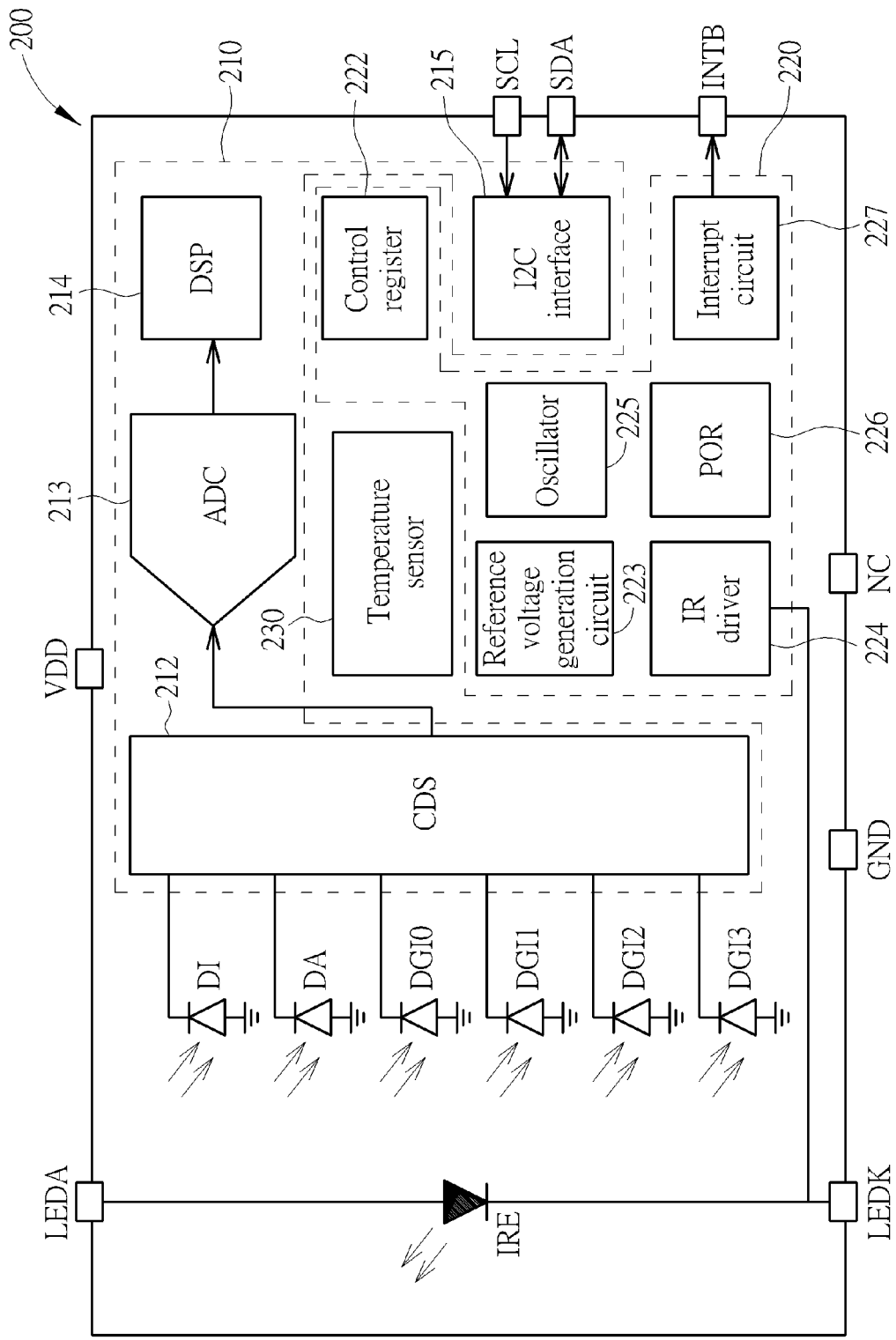
FIG. 2 is a diagram illustrating an exemplary optical sensor apparatus according to another embodiment of the present invention.

Please refer to FIG. 2, which is a diagram illustrating an exemplary optical sensor apparatus according to another embodiment of the present invention. In this embodiment, the optical sensor apparatus 200 may include a plurality of detection devices to integrate proximity sensing, ambient light detection and gesture recognition, wherein the detection devices may include the photodetector DI shown in FIG. 1 and a plurality of photodetectors DA, DGI0, DGI1, DGI2 and DGI3. The optical sensor apparatus 200 may further include an IR LED IRE, a processing circuit 210, a control circuit 220 and a temperature sensor 230. The IR LED IRE may be used to emit IR light. Hence, when the IR LED IRE is activated, the photodetector DA may detect IR light reflected from an object (located around the optical sensor apparatus 200; not shown in FIG. 2) and accordingly generate a detection signal to the processing circuit 210 for proximity sensing.

Figure 3:
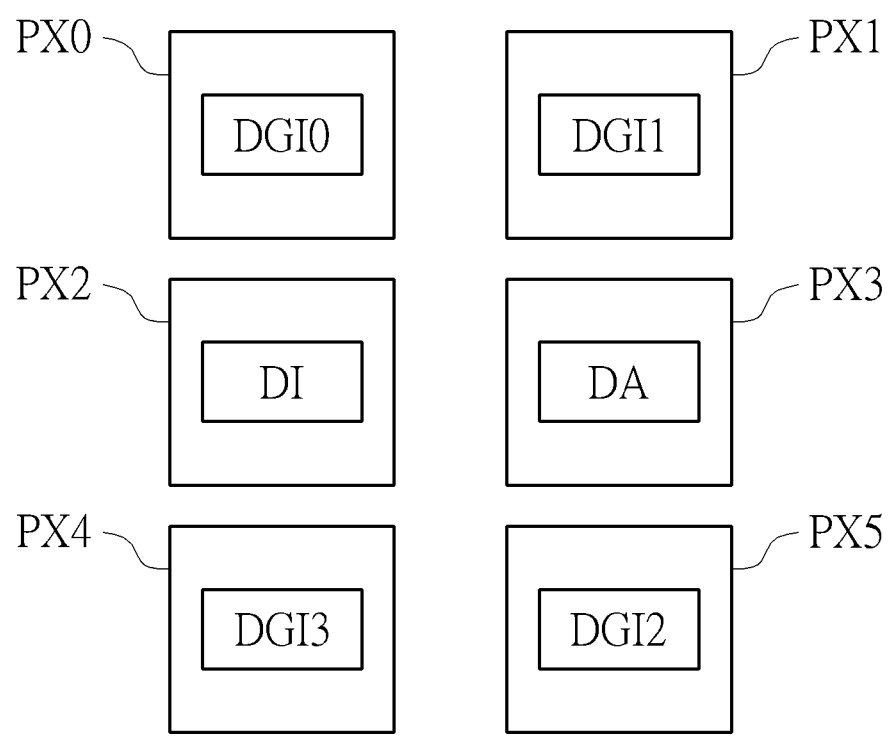
FIG. 3 is an implementation of a pixel layout corresponding to the photodetectors shown in FIG. 2.

The photodetector DA may be at least a portion of an ambient light sensing pixel (not shown in FIG. 2), and is arranged to detect ambient light intensity to thereby generate a detection signal to the processing circuit 210 for ambient light detection. The photodetectors DGI0, DGI1, DGI2 and DGI3 may detect IR light reflected from the object when the IR LED IRE is activated, and accordingly generate a plurality of detection signals to the processing circuit 210 for gesture recognition. In one implementation, the photodetectors DGI0, DGI1, DGI2 and DGI3 may be disposed in a two by two sensor array (i.e. a two by two pixel array). As the photodetectors DGI0, DGI1, DGI2 and DGI3 are disposed at different locations, the processing circuit 210 may recognize a gesture according to a phase difference of detection signals generated by the two by two sensor array when processing the detection signals. Please refer to FIG. 3 in conjunction with FIG. 2. FIG. 3 is an implementation of a pixel layout corresponding to the photodetectors DI, DA, DGI0, DGI1, DGI2 and DGI3 shown in FIG. 2. As shown in FIG. 3, the photodetectors DI, DA, DGI0, DGI1, DGI2 and DGI3 correspond to a plurality of pixels PX0-PX5, respectively. The pixel PX2 may detect a reflected IR signal, and perform proximity sensing with reference to an ambient IR light level. The pixel PX3 may detect ambient light intensity. The pixels PX0, PX1, PX4 and PX5 may be used as gesture sensing pixels, wherein the control circuit 220 may activate the pixels PX0, PX1, PX4 and PX5 concurrently, and the processing circuit 210 may integrate detection signals generated by the pixels PX0, PX1, PX4 and PX5 over time. For example, the pixels PX0, PX1, PX4 and PX5 may be synchronized in an integration period. Hence, when the object is moving (e.g. the user's hand is sliding from the pixel PX0 to the pixel PX4), a phase difference may be generated in the detection signals of the pixels PX0, PX1, PX4 and PX5 (e.g. respective maximum signal intensities of the pixels occur at different points in time, or respective signal waveforms of the pixels have different time dependencies), and the processing circuit 210 may recognize gesture information of the object accordingly.

Please note that the pixel layout shown in FIG. 3 is for illustrative purposes only, and is not meant to be a limitation of the present invention. In other words, the layout of the pixels PX0-PX5 is not limited to an array arrangement. Additionally, the processing circuit 210 may obtain an image of the object according to detection signals generated by the aforementioned two by two sensor array (i.e. the pixels PX0, PX1, PX4 and PX5 shown in FIG. 3), thereby recognizing a gesture corresponding to the object. It should be noted that, as the two by two sensor array runs at a very high frame rate (e.g. between 100 to 2000 frames per second), a subtle difference of change of signal intensity during an integration period is sensed.

Please refer to FIG. 2 again. The processing circuit 210 may include, but is not limited to, a CDS 212, an ADC 213, a DSP circuit 214 (labeled "DSP") and an I2C interface 215, wherein the I2C interface 215 may be coupled to a pad SCL corresponding to a serial clock line (SCL) (not shown in FIG. 2) and a pad SDA corresponding to a serial data line (SDA) (not shown in FIG. 2). The control circuit 220 may include, but is not limited to, a control register 222, a reference voltage generation circuit 223, an IR LED driver 224 (labeled "IR driver"), an oscillator 225, a POR circuit 226 (labeled "POR") and an interrupt circuit 227. The IR LED driver 224 may control an IR LED IRE through a pad LEDK, wherein the IR LED IRE is further coupled to a pad LEDA. The interrupt circuit 227 may receive an interrupt signal (not shown in FIG. 2) from a pad INTB. A pad VDD is coupled to a power supply (not shown in FIG. 2), a pad GND is coupled to a ground voltage (not shown in FIG. 2), and a pad NC is a not connected (NC) pad. As a person skilled in the art should understand operations of each circuit element included in the processing circuit 210 and the processing circuit 220, further description is omitted here for brevity.

Figure 4:
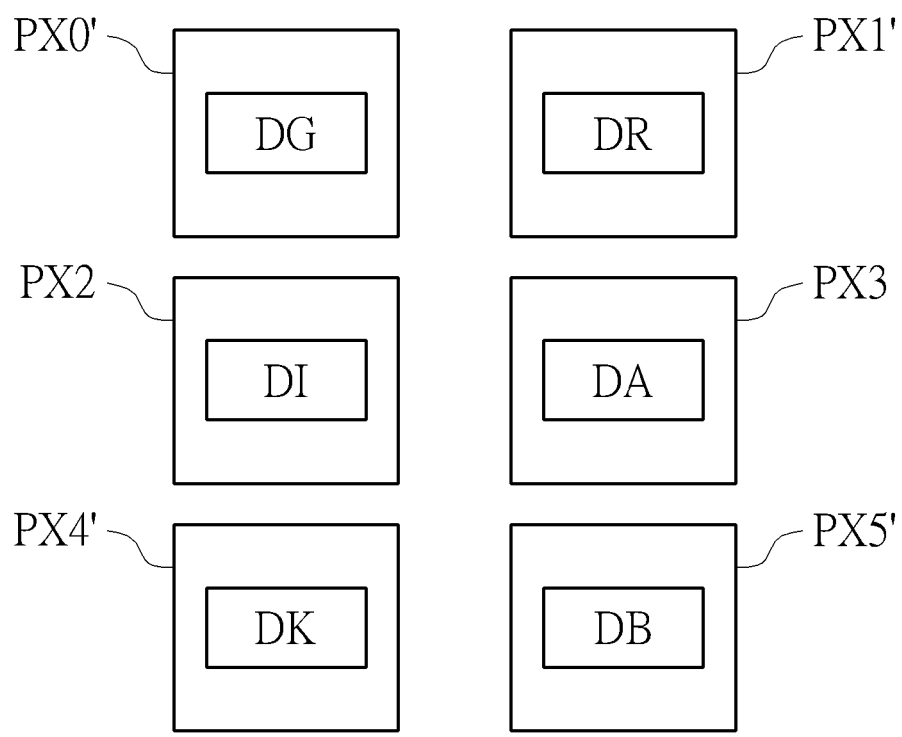
FIG. 4 is an exemplary pixel layout corresponding to a plurality of photodetectors according to an embodiment of the present invention.

The integration concept illustrated in FIG. 2 may be employed in color sensing. Please refer to FIG. 4, which is an exemplary pixel layout corresponding to a plurality of photodetectors according to an embodiment of the present invention. The pixel layout shown in FIG. 4 is based on the pixel layout shown in FIG. 3, wherein the main difference is that the gesture sensing pixels are replaced by color sensing pixels. Specifically, the pixel layout shown in FIG. 4 may include the pixels PX2 and PX3 shown in FIG. 2; a plurality of pixels PX0', PX1' and PX5' may correspond to the photodetectors DG, DR and DB, respectively; and a pixel PX4' may correspond to a photodetector DK which generates a black reference level (i.e. the pixel PX4' may be regarded as a dark/black pixel). It should be noted that, as the photodetector DK may be optically shielded from visible light, the generated black reference level may represent an ambient noise level. Hence, detection signals generated by the photodetector DG, DR and DB may subtract the black reference level generated by the photodetector DK in order to improve the quality of color detection. In brief, the pixels PX0', PX1', PX2, PX3, PX4' and PX5' may employ the six-photodetector sensor architecture shown in FIG. 2, and proximity sensing, ambient light detection and color sensing functions are integrated in an optical sensor apparatus.

Figure 5:
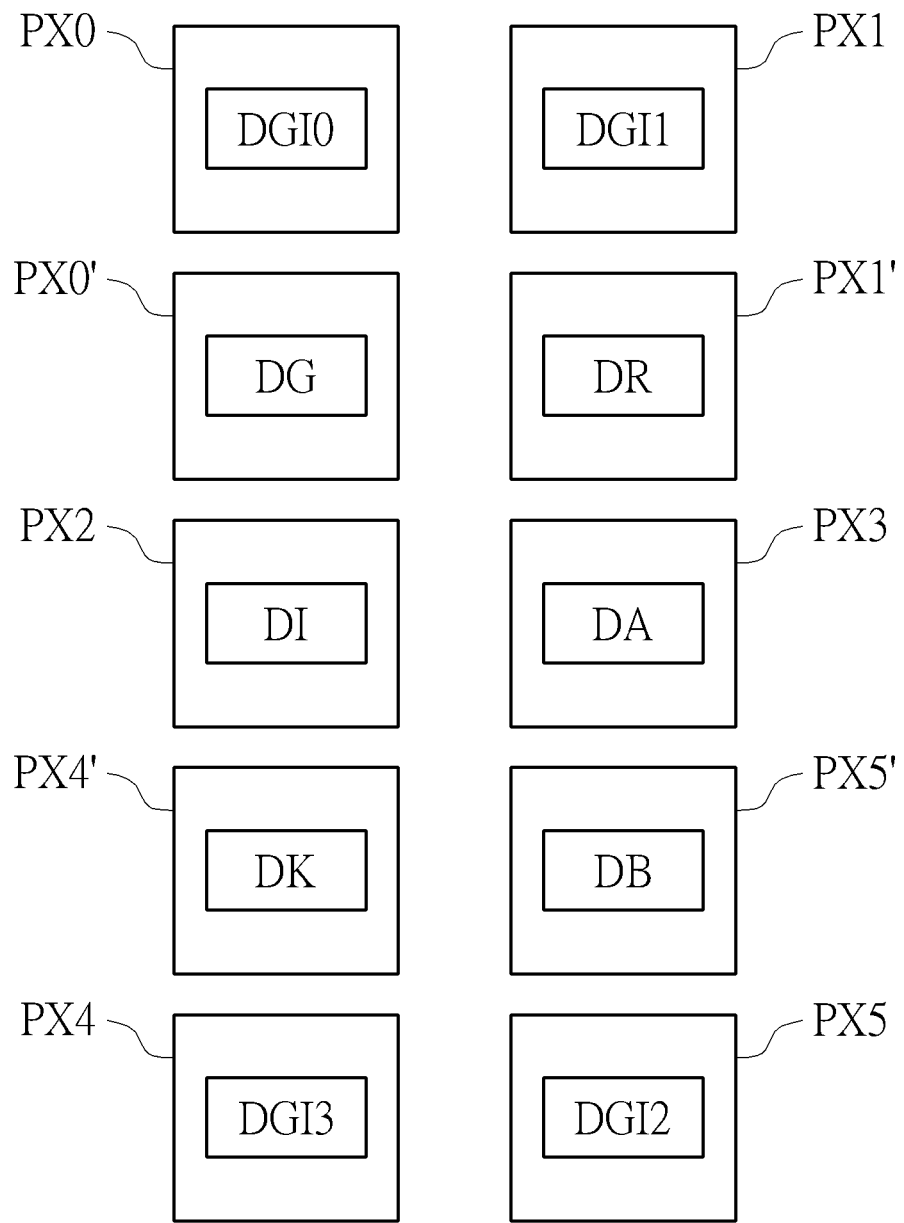
FIG. 5 is an exemplary pixel layout corresponding to a plurality of photodetectors according to another embodiment of the present invention.

In order to integrate proximity sensing, ambient light detection, color sensing and gesture recognition functions into the same optical sensor apparatus (or the same chip), the pixel layout shown in FIG. 3 and the pixel layout shown in FIG. 4 may be integrated. Please refer to FIG. 5, which is an exemplary pixel layout corresponding to a plurality of photodetectors according to another embodiment of the present invention. In this embodiment, the pixel layout shown in FIG. 5 may include the pixels PX0-PX5 shown in FIG. 3 and the pixels PX0', PX1', PX4' and PX5'. Hence, the ten pixels (or photodetectors) shown in FIG. 5 may realize proximity sensing, ambient light detection, color sensing and gesture recognition.

As mentioned above, color spectrum coating and/or filter design may be utilized to implement a dual function detection device to reduce the number of detection devices required. Please refer to FIG. 6, which is a block diagram illustrating an exemplary optical sensor apparatus according to an embodiment of the present invention. In this embodiment, the optical sensor apparatus 600 may include, but is not limited to, an IR light generating device 602 (e.g. the IR LED IRE shown in FIG. 2), N first detection devices 604_1-604_N, a second detection device 606, an ambient light detection device 607, a proximity sensing device 608, a processing circuit 610 and a control circuit 620, wherein N is a positive integer. Each of the N first detection devices 604_1-604_N and the second detection device 606 may be arranged to detect IR light, and each of the first detection devices 604_1-604_N may be further arranged to detect visible light, wherein the N first detection devices 604_1-604_N may detect N different visible wavelength ranges, respectively. In other words, different first detection devices may respond to the N different visible wavelength ranges, respectively. The second detection device 606 may be optically shielded from the visible light (e.g. a dark pixel). To put it differently, the second detection device 606 does not respond to the visible light. Hence, a signal component of a detection signal generated by the second detection device 606 may be regarded as interference which is not caused by the visible light (e.g. interference caused by variances in manufacturing processes). For the sake of brevity, operations of an optical sensor apparatus implemented by dual function detection devices are described below, and details of color spectrum coating and filter design of the aforementioned first and second detection devices will be described later.

The ambient light device 607 may be used for detecting ambient light to generate an ambient light detection signal SA, and the proximity sensing device 608 may be used for detecting IR light (e.g. an IR light signal IRR reflected from an object OB in response to an IR light signal IRL generated by the IR light generating device 602) to generate a proximity sensing signal SP.

The processing circuit 610 is coupled to the N first detection devices 604_1-604_N, the second detection device 606, the ambient light detection device 607 and the proximity sensing device 608, and is arranged to process detection signals generated by the N first detection devices 604_1-604_N, the second detection device 606, the ambient light detection device 607 and the proximity sensing device 608 to obtain related sensing information. The control circuit 620 may be used to control signal processing of the processing circuit 610, activation of the IR light generating device 602, detection operations of the N first detection devices 604_1-604_N, the second detection device 606, the ambient light detection device 607 and the proximity sensing device 608.

It should be noted that, as each of the N first detection devices 604_1-604_N may be used for detecting IR light and visible light (i.e. having an IR pass wavelength range and a visible light pass wavelength range), the proposed first detection device may have multiple sensing functions (i.e. a multi-purpose detector). For example, in a first sensing mode (e.g. a color sensing mode), the N first detection devices 604_1-604_N may generate N detection signals $CS_1$-$CS_N$ in response to light VL coming from the object OB, wherein the N detection signals $CS_1$-$CS_N$ may carry detection information about N different visible wavelength ranges, respectively (e.g. including detection information about a red wavelength range, a green wavelength range and a blue wavelength range). In addition, the second detection device 606 may generate a detection signal $CS_K$ (i.e. a reference signal which almost does not respond to visible light) in response to the light VL, wherein the detection signal $CS_K$ may carry information about noise/interference caused by non-visible light and/or variances in manufacturing processes. Next, the processing circuit 610 may obtain color information of the object OB according to the N detection signals $CS_1$-$CS_N$ and the detection signal $CS_K$.

In a second sensing mode (e.g. a gesture recognition mode), the N first detection devices 604_1-604_N and the second detection device 606 may generate (N+1) detection signals $GS_1$-$GS_{N+1}$ by detecting light reflected from the object OB when the IR light generating device 602 is activated (i.e. emitting the IR light signal IRL), wherein the (N+1) detection signals $GS_1$-$GS_{N+1}$ are generated mainly due to the IR light signal IRR (a reflected signal reflected from the object OB in response to the IR light signal IRL). Additionally, the N first detection devices 604_1-604_N and the second detection device 606 may generate (N+1) detection signals $GS_1'$-$GS_{N+1}'$ by detecting light reflected from the object OB when the IR light generating device 602 is deactivated (i.e. no IR light is emitted), wherein the (N+1) detection signals $GS_1'$-$GS_{N+1}'$ may be regarded as sensing results which are obtained by detecting reflected signals reflected from the object OB in response to background ambient IR light. Next, the processing circuit 610 may recognize gesture information of the object OB according to the (N+1) detection signals $GS_1$-$GS_{N+1}$ and the (N+1) detection signals $GS_1'$-$GS_{N+1}'$.

For a better understanding of the present invention, the detection devices shown in FIG. 6 may be implemented by sensing pixels in the following implementations. However, this is for illustrative purposes only, and is not meant to be a limitation of the present invention. Please refer to FIG. 6 and FIG. 7 together. FIG. 7 is an implementation of the detection devices shown in FIG. 6. In this implementation, the N first detection devices 604_1-604_N may be implemented by N sensing pixels, respectively, wherein the N sensing pixels may include a plurality of pixels P0, P1 and P5 (i.e. N is greater than or equal to three), and the pixels P0, P1 and P5 may be used to detect a green wavelength range, a red wavelength range and a blue wavelength range within visible spectrum, respectively. The second detection device 606 shown in FIG. 6 may be implemented by a pixel P4 (e.g. a dark pixel), the ambient light detection device 607 shown in FIG. 6 may be implemented by a pixel P3, and the proximity sensing device 608 shown in FIG. 6 may be implemented by a pixel P2.

It should be noted that the pixels P0-P5 may have different purposes in different sensing modes. Hence, the right of FIG. 7 illustrates a pixel layout in a color sensing mode, and a purpose of each pixel in the color sensing mode is labeled, wherein the pixel layout of the pixels P0-P5 shown at the right of FIG. 7 may employ the pixel layout shown in FIG. 4; the left of FIG. 7 illustrates a pixel layout in a gesture recognition mode, and a purpose of each pixel in the gesture recognition mode is labeled, wherein the pixel layout of the pixels P0-P5 shown at the left of FIG. 7 may employ the pixel layout shown in FIG. 3.

Specifically, in a case wherein the optical sensor apparatus 600 operates in the color sensing mode (i.e. the right of FIG. 7), as the pixels P0, P1 and P5 may detect the green, red and blue wavelength ranges within the visible spectrum in addition to IR light, the pixels P0, P1 and P5 may be regarded as a green pixel (labeled "G"), a red pixel (labeled "R") and a blue pixel (labeled "B"). Additionally, as the pixel P4 responds to IR light only, the pixel P4 may be regarded as a dark/black pixel and labeled "K". The pixel P2 (labeled "IR") and the pixel P3 (labeled "CLR") may be used for proximity sensing and ambient light sensing/detection, respectively. When the pixels P0, P1, P4 and P5 generate a plurality of detection signals $CS_G$, $CS_R$, $CS_B$ and $CS_K$ in response to light coming from the object OB, the processing circuit 610 may obtain the color information of the object OB according to respective a respective signal difference between the detection signal $CS_K$ and each of the detection signals $CS_G$, $CS_R$ and $CS_B$.

For example, the processing circuit 610 may subtract the detection signal $CS_K$ from the detection signal $CS_G$ directly to eliminate/reduce IR information carried by the detection signal $CS_G$ and further eliminate/reduce interference affecting the detection result of the green wavelength range. Similarly, the processing circuit 610 may subtract the detection signal $CS_K$ from the detection signal $CS_R/CS_B$ directly to obtain more accurate color information. However, this is for illustrative purposes only, and is not meant to be a limitation of the present invention. In an alternative design, the processing circuit 610 may refer to the detection signal $CS_K$ to adjust the detection signals $CS_G/CS_R/CS_B$, and process the adjusted detection signals $CS_G/CS_R/CS_B$ to obtain the color information.

In a case wherein the optical sensor apparatus 600 operates in the gesture recognition mode (i.e. the left of FIG. 7), as the pixels P0, P1, P4 and P5 may be used to detect IR light, the pixels P0, P1, P4 and P5 may be regarded as a plurality of gesture sensing pixels and labeled "GIR0", "GIR1", "GIR3" and "GIR2", respectively. Additionally, the pixel P2 (labeled "IR") and the pixel P3 (labeled "CLR") may be used for proximity sensing and ambient light sensing/detection, respectively. When the IR light generating device 602 is activated, the pixels P0, P1, P4 and P5 may detect light reflected from the object OB to generate a plurality of detection signals $GS_G$, $GS_R$, $GS_K$ and $GS_B$, and when the IR light generating device 602 is deactivated, the pixels P0, P1, P4 and P5 may detect light reflected from the object OB to generate a plurality of detection signals $GS_G'$, $GS_R'$, $GS_K'$ and $GS_B'$. The processing circuit 610 may recognize the gesture information of the object OB according to a signal difference between a detection signal (e.g. the detection signal $GS_G/GS_R/GS_K/GS_B$; generated when the IR light generating device 602 is activated) and another detection signal (e.g. the detection signal $GS_G'/GS_R'/GS_K'/GS_B'$; generated when the IR light generating device 602 is deactivated) generated by each of the pixels P0, P1, P4 and P5.

For example, the processing circuit 610 may subtract the detection signal $GS_G'$ from the detection signal $GS_G$ directly to eliminate/reduce visible light information detected by the pixel P0 (e.g. a red light detection result) and further eliminate/reduce interference caused by ambient IR light. Similarly, the processing circuit 610 may subtract the detection signal $GS_R'$ from the detection signal $GS_R$ directly, subtract the detection signal $GS_K'$ from the detection signal $GS_K$ directly and subtract the detection signal $GS_B'$ from the detection signal $GS_B$ directly to obtain more accurate gesture information. However, this is for illustrative purposes only, and is not meant to be a limitation of the present invention. In an alternative design, the processing circuit 610 may refer to the detection signal $GS_G'/GS_R'/GS_K'/GS_B'$ to adjust the detection signals $GS_G/GS_R/GS_K/GS_B$, and process the adjusted detection signals $GS_G/GS_R/GS_K/GS_B$ to obtain the gesture information.

Figure 7:
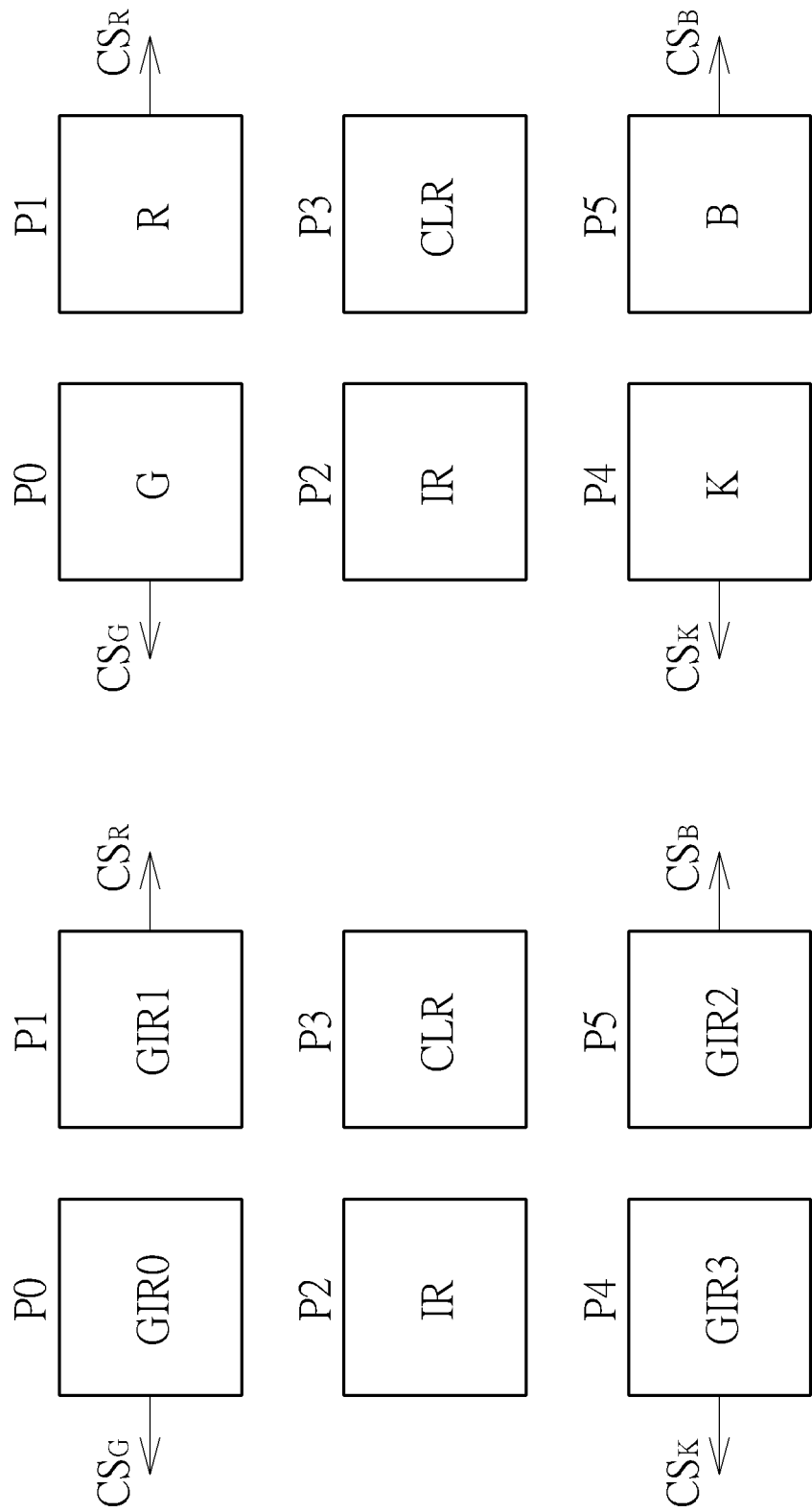
FIG. 7 is an implementation of the detection devices shown in FIG. 6.
Figure 8:
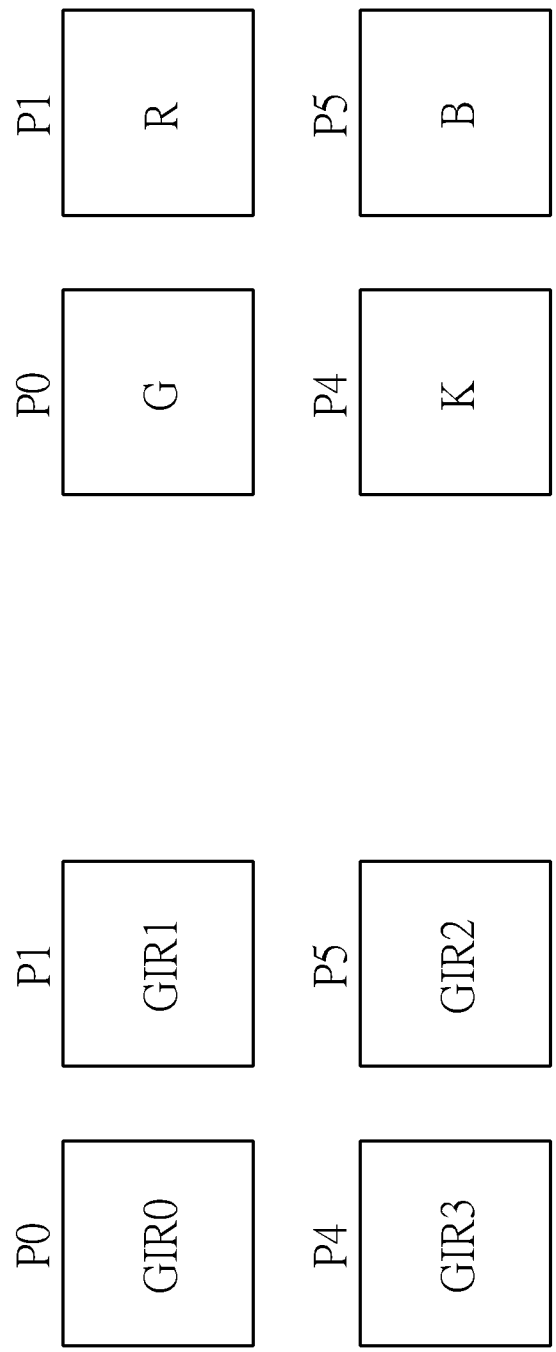
FIG. 8 is another implementation of the detection devices shown in FIG. 6.

In addition to color sensing and gesture recognition, the proposed detection device (sensing pixel) may be used for other sensing applications. In one implementation, as the N first detection devices 604_1-604_N shown in FIG. 6 (or the pixels P0, P1 and P5 shown in FIG. 7) and the second detection device 606 (or the pixels P4 shown in FIG. 7) may be used for detecting IR light, one of the second detection device 606 and the N first detection devices 604_1-604_N may be used for proximity sensing. In other words, at least one of the second detection device 606 and the N first detection devices 604_1-604_N may be switchably arranged for proximity sensing. In another implementation, as visible spectrum is similar to green light spectrum, one of the N first detection devices 604_1-604_N, which is used for detecting a green wavelength range, may be further used for detecting ambient light. In other words, at least one of the N first detection devices 604_1-604_N may be arranged for switchably detecting a green wavelength range and ambient light. Please refer to FIG. 8, which is another implementation of the detection devices shown in FIG. 6. The pixel layout shown in FIG. 8 is based on that shown in FIG. 7, wherein the main difference is that the proximity sensing function of the pixel P2 shown in FIG. 7 is implemented by one of the pixels P0, P1, P4 and P5 shown in FIG. 8, and the ambient light detection function of the pixel P3 is implemented by the pixels P0 shown in FIG. 8. For the sake of brevity, similar descriptions are not repeated here.

In view of above, the proposed multi-purpose detection device may reduce the number of devices required. For example, when the architecture of the optical sensor apparatus 600 shown in FIG. 6 and the pixel layout shown in FIG. 8 are employed, only 4 sensing pixels are needed to realize the color sensing, gesture recognition, ambient light detection and proximity sensing functions.

The above is for illustrative purposes only, and is not meant to be a limitation of the present invention. For example, the pixels P0, P1, P4 and P5 shown in FIG. 7/FIG. 8 may be implemented by a cyan pixel, a magenta pixel, a yellow pixel and a black pixel (i.e. process color), wherein each of the cyan pixel, the magenta pixel, the yellow pixel and the black pixel is capable of detecting IR light. Additionally, the number of the N first detection devices 604_1-604_N shown in FIG. 6 is not limited to three. In one implementation, the proposed optical sensor apparatus may include the pixel P0 and the pixel P2 shown in FIG. 8 only so that the color sensing function (e.g. sensing green light only), the gesture recognition function (e.g. recognizing a direction of movement of the object OB), the ambient light detection function and the proximity sensing function may be integrated in a single optical sensor apparatus. In another implementation, the number of the N first detection devices 604_1-604_N shown in FIG. 6 may be greater than three so that the proposed optical sensor apparatus may be employed in image sensing. In brief, as long as an optical sensor apparatus is implemented by detection device(s) capable of detecting a plurality of wavelength ranges (including an IR wavelength range and a visible light wavelength range), various modifications or changes may be made without departing from the scope and spirit of this invention.

Figure 9:
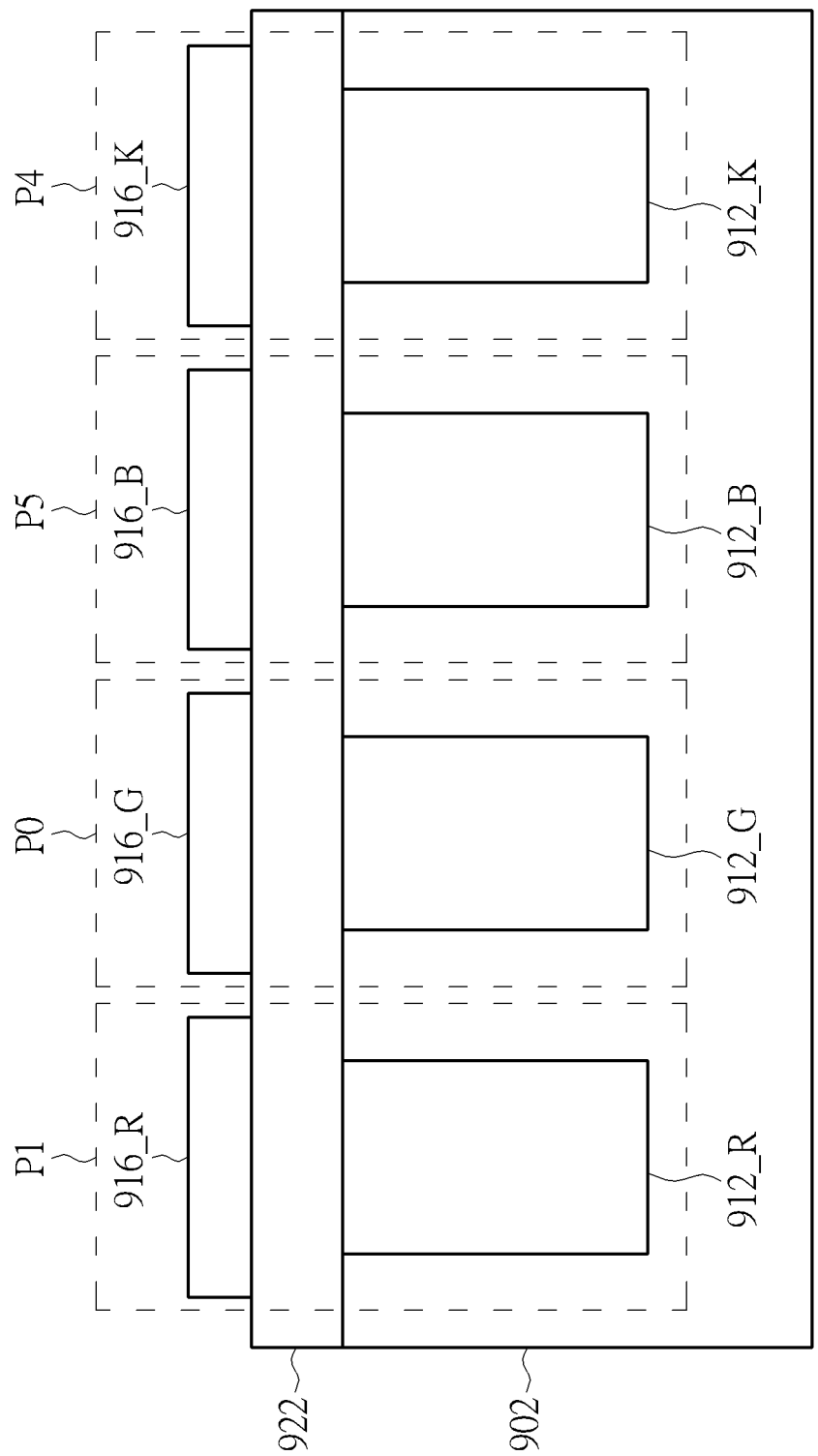
FIG. 9 is a cross-section view of the N first detection devices and the second detection device shown in FIG. 6 according to an embodiment of the present invention.

For a better understanding of the implementation details of the proposed detection device utilizing color spectrum coating and filter design, an exemplary implementation of a stack structure is given in the following. However, a person skilled in the art should understand that this is not meant to be a limitation of the present invention. Please refer to FIG. 9, which is a cross-section view of the N first detection devices 604_1-604_N and the second detection device 606 shown in FIG. 6 according to an embodiment of the present invention. In this embodiment, the N first detection devices 604_1-604_N may be implemented by the pixels P0, P1 and P5 shown in FIG. 7/FIG. 8 (i.e. N equals to three), and the second detection device 606 may be implemented by the pixel P4 shown in FIG. 7/FIG. 8. As shown in FIG. 9, the optical sensor apparatus 600 may further include a substrate 902 where detection devices and/or other circuit elements may be disposed. The pixel P0 may include a photodetector 912G and a filter 916_G, the pixel P1 may include a photodetector 912_R and a filter 916_R, the pixel P5 may include a photodetector 912_B and a filter 916_B, and the pixel P4 may include a photodetector 912_K and a filter 916_K. Each of the photodetectors 912_G, 912_R, 912_B and 912_K may be disposed on the substrate 902, and the filters 916_G, 916_R, 916_B and 916_K may be disposed in correspondence with the photodetectors 912_G, 912_R, 912_B and 912_K, respectively, wherein a dielectric layer 922 may be deposited between a photodetector and a corresponding filter.

It should be noted that the proposed filter may be used for detecting visible light and IR light. By way of example but not limitation, the proposed filter may be implemented by a thin film filter so that a filter capable of detecting visible light and IR light may be implemented using suitable thin film material. Please refer to FIG. 10, which is a diagram illustrating respective relationships between a wavelength of incident light and a light transmittance of the filters 916_G, 916_R, 916_B and 916_K shown in FIG. 9. In this implementation, a transmission range of the filter 916_G (e.g. corresponding to a transmittance higher than a predetermined value) includes a green wavelength range and an IR wavelength range only; a transmission range of the filter 916_R includes a red wavelength range and an IR wavelength range only; a transmission range of the filter 916_B includes a blue wavelength range and an IR wavelength range only; and a transmission range of the filter 916_K includes an IR wavelength range only.

Figure 10:
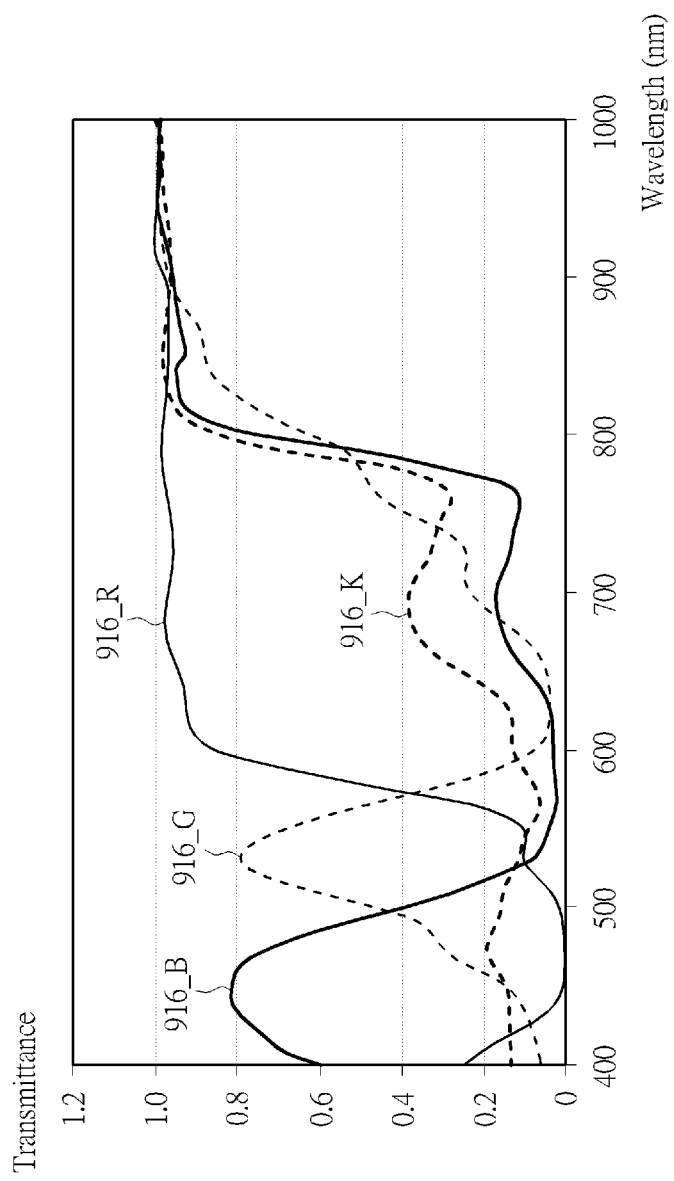
FIG. 10 is a diagram illustrating respective relationships between a wavelength of incident light and a light transmittance of the filters shown in FIG. 9.
Figure 11:
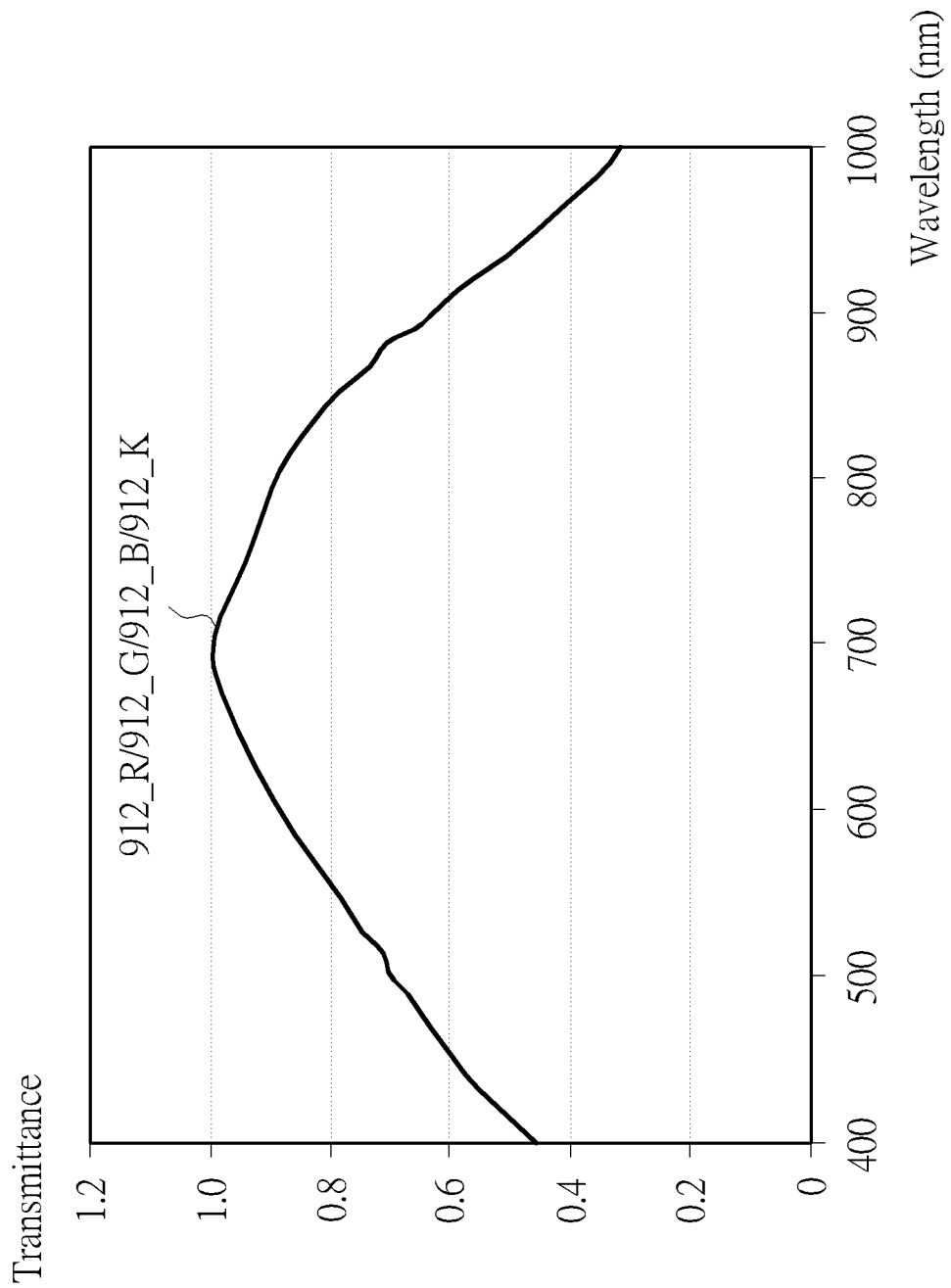
FIG. 11 is a diagram illustrating respective relationships between a wavelength of incident light and a light transmittance of the photodetectors shown in FIG. 9.
Figure 12:
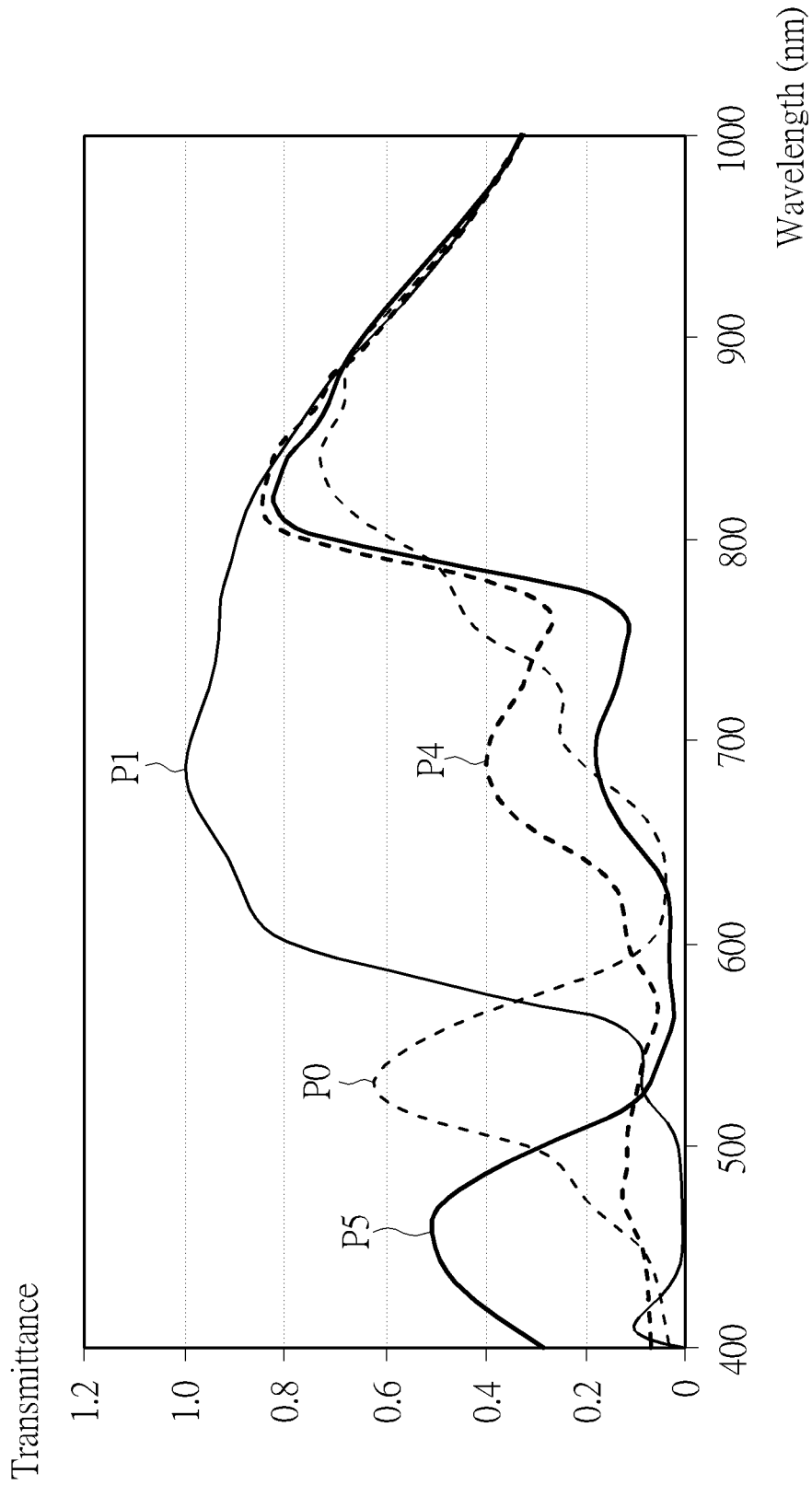
FIG. 12 is a diagram illustrating respective relationships between a wavelength of incident light and a light transmittance of the pixels shown in FIG. 9.

As the photodetector 912_G/912_R/912_B/912_K shown in FIG. 9 performs light detection through the corresponding filter, a sensor spectrum of each of the pixels P0, P1, P4 and P5 shown in FIG. 9 may be determined according to a photodetector sensitivity spectrum and a filter sensitivity spectrum thereof. Please refer to FIG. 11 and FIG. 12 in conjunction with FIG. 10. FIG. 11 is a diagram illustrating respective relationships between a wavelength of incident light and a light transmittance of the photodetectors 912_G, 912_R, 912_B and 912_K shown in FIG. 9. FIG. 12 is a diagram illustrating respective relationships between a wavelength of incident light and a light transmittance of the pixels P0, P1, P4 and P5 shown in FIG. 9, wherein a sensor spectrum of each pixel may be determined according to a corresponding photodetector sensitivity spectrum shown in FIG. 11 and a corresponding filter sensitivity spectrum shown in FIG. 10. For the sake of brevity, it is assumed that the photodetectors 912_G, 912_R, 912_B and 912_K have substantially the same photodetector sensitivity spectrum. However, this is not meant to be a limitation of the present invention. As shown in FIG. 10 and FIG. 12, the transmission range of the filter 916G includes a visible wavelength range (i.e. a green wavelength range) and an IR wavelength range corresponding to the pixel P0 only; the transmission range of the filter 916_R includes a visible wavelength range (i.e. a red wavelength range) and an IR wavelength range corresponding to the pixel P1 only; a transmission range of the filter 916_B includes a visible wavelength range (i.e. a blue wavelength range) and an IR wavelength range corresponding to the pixel P5 only; and a transmission range of the filter 916_K includes an IR wavelength range corresponding to the pixel P4 only.

As shown in FIG. 11, the photodetector sensitivity spectrum of each photodetector has a wider detection wavelength range so that each photodetector may be used for ambient light detection. In other words, a photodetector having the photodetector sensitivity spectrum shown in FIG. 11 may be used to implement the photodetector DA shown in FIG. 2, the ambient light detection device 607 shown in FIG. 6 and the pixel P3 shown in FIG. 7. In another implementation, the photodetector 912_G/912_R/912_B/912_K and a filter having a high transmittance may be used together to implement an ambient light detection device.

Figure 13:
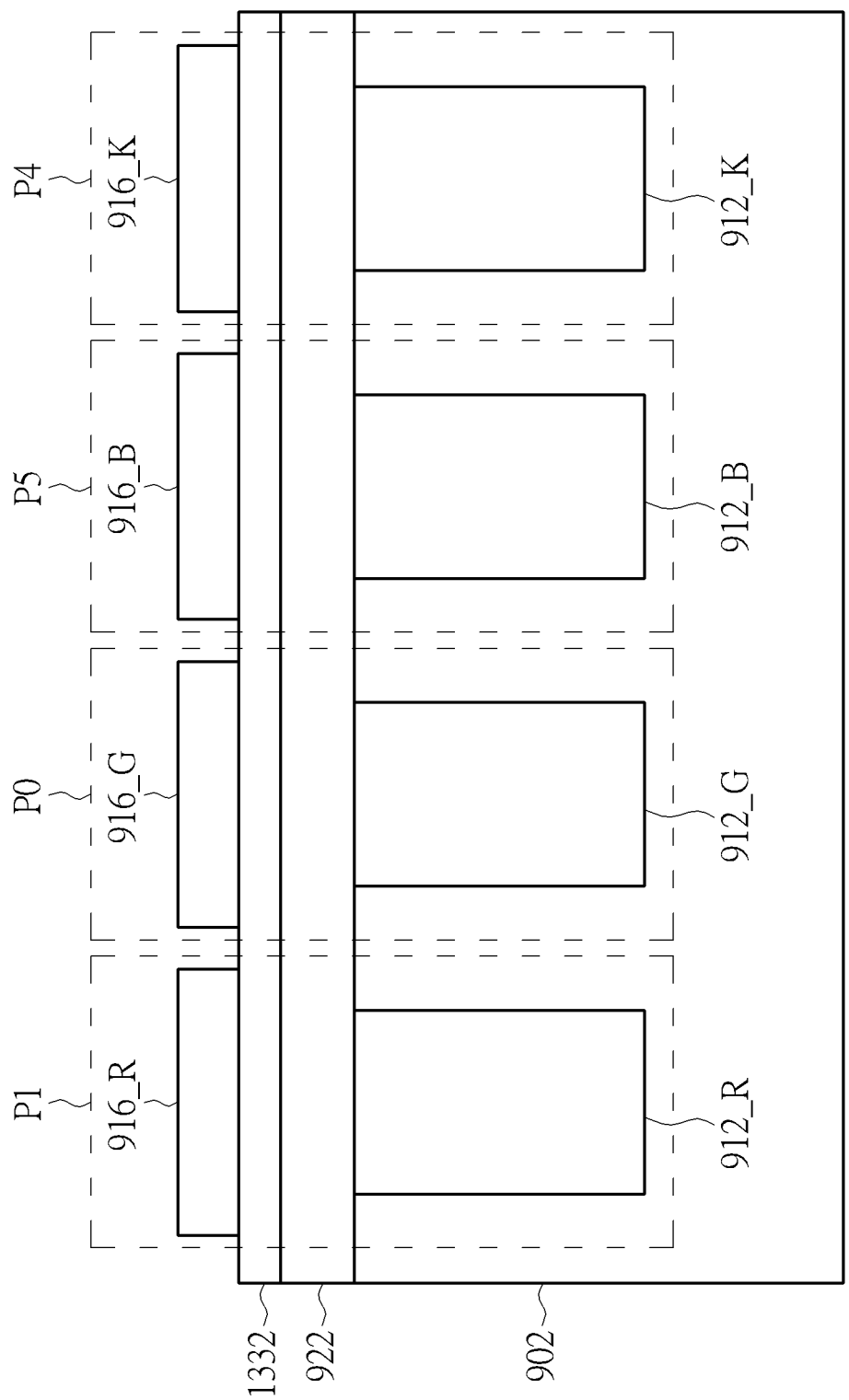
FIG. 13 is a cross-section view of the N first detection devices and the second detection device shown in FIG. 6 according to another embodiment of the present invention.

The device architecture shown in FIG. 9 may further include a coating layer to enhance the detection quality. Please refer to FIG. 13, which is a cross-section view of the N first detection devices 604_1-604_N and the second detection device 606 shown in FIG. 6 according to another embodiment of the present invention. The device architecture shown in FIG. 13 is based on that shown in FIG. 9, wherein the main difference is that the device architecture shown in FIG. 13 further includes a coating layer 1332 (i.e. the optical sensor apparatus 600 may further include the coating layer 1332). In this embodiment, the coating layer 1332 may be disposed in correspondence with the pixels P0, P1, P4 and P5. For example, the coating layer 1332 may be deposited/coated between the dielectric layer 922 and each filter. In an alternative design, the coating layer 1332 may be coated on a side of each filter, wherein the filter receives light from the side. When the light travels toward a pixel (e.g. one of the pixels P0, P1, P4 and P5), the corresponding photodetector may perform light detection through the corresponding filter and the coating layer 1332.

Figure 14:
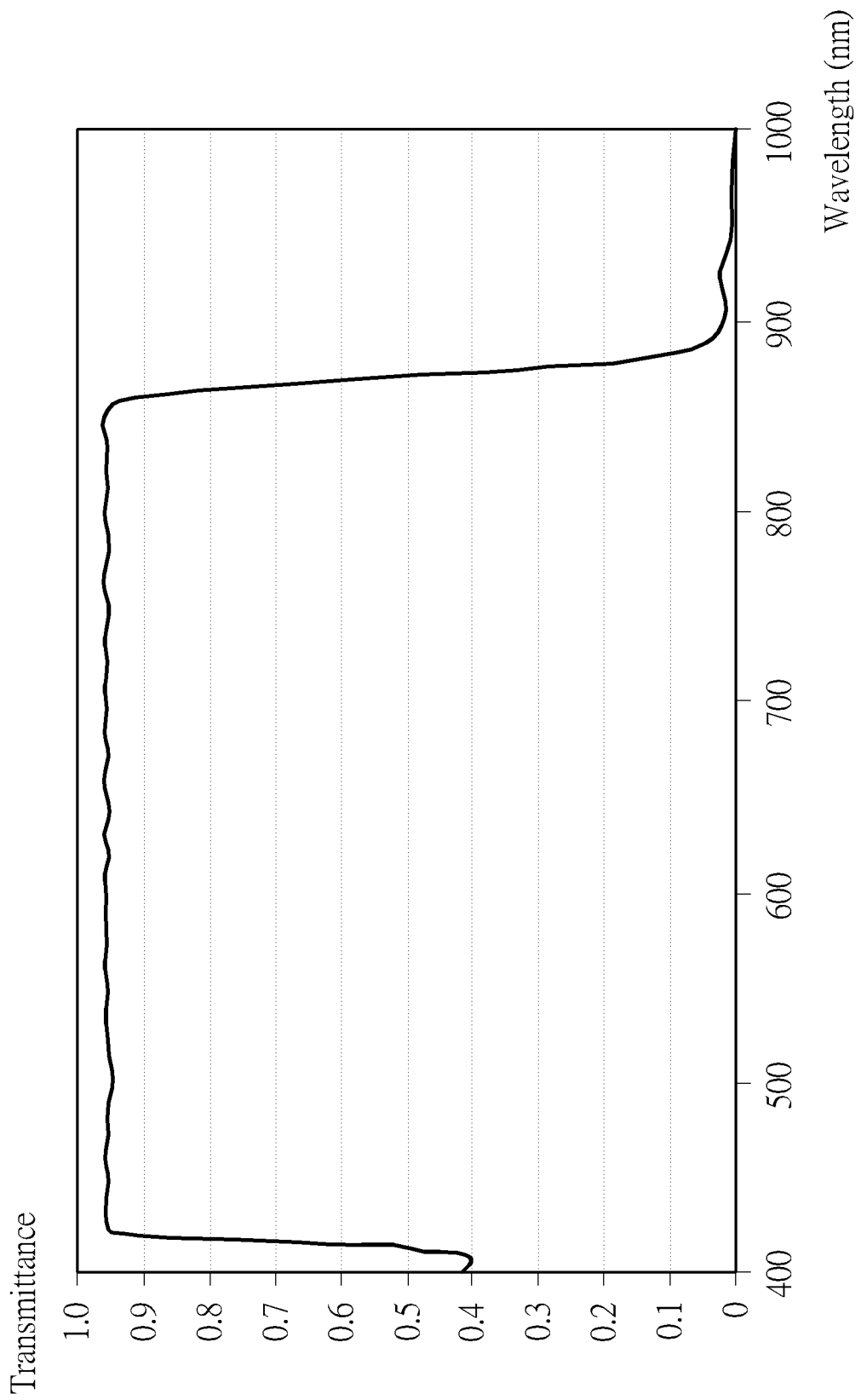
FIG. 14 is a diagram illustrating respective relationships between a wavelength of incident light and a light transmittance of the coating layer shown in FIG. 13 according to an embodiment of present invention.
Figure 15:
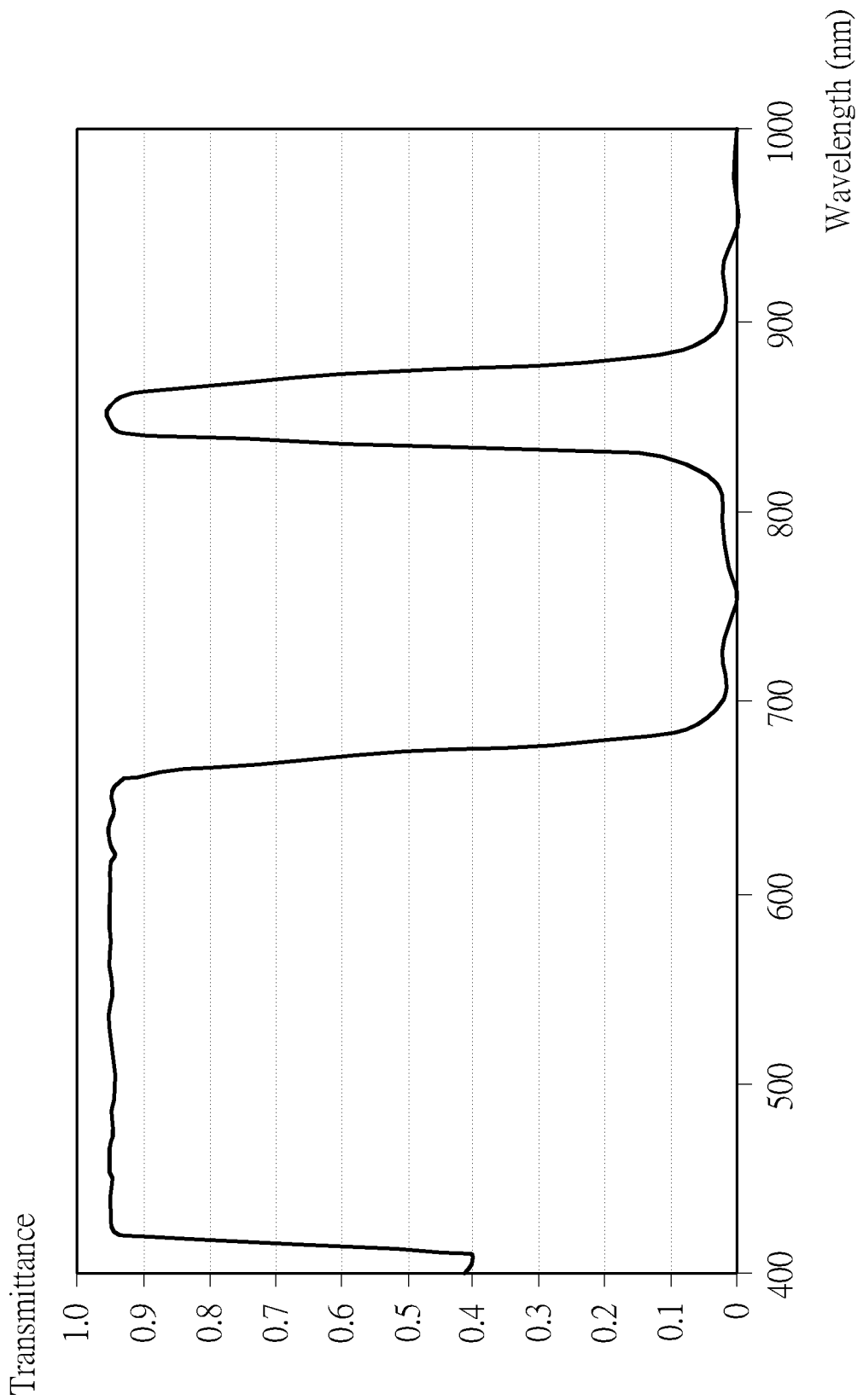
FIG. 15 is a diagram illustrating respective relationships between a wavelength of incident light and a light transmittance of the coating layer shown in FIG. 13 according to another embodiment of present invention.

Please refer to FIG. 14, which is a diagram illustrating respective relationships between a wavelength of incident light and a light transmittance of the coating layer 1332 shown in FIG. 13 according to an embodiment of present invention. As shown in FIG. 14, the coating layer 1332 may allow visible light to pass therethrough and have a specific IR cut-off wavelength range (e.g. longer than 900 nm wavelength). Please refer to FIG. 15, which is a diagram illustrating respective relationships between a wavelength of incident light and a light transmittance of the coating layer 1332 shown in FIG. 13 according to another embodiment of present invention. As shown in FIG. 15, the coating layer 1332 may allow visible light to pass therethrough and have a specific IR pass wavelength range (e.g. around 850 nm wavelength).

Figure 16:
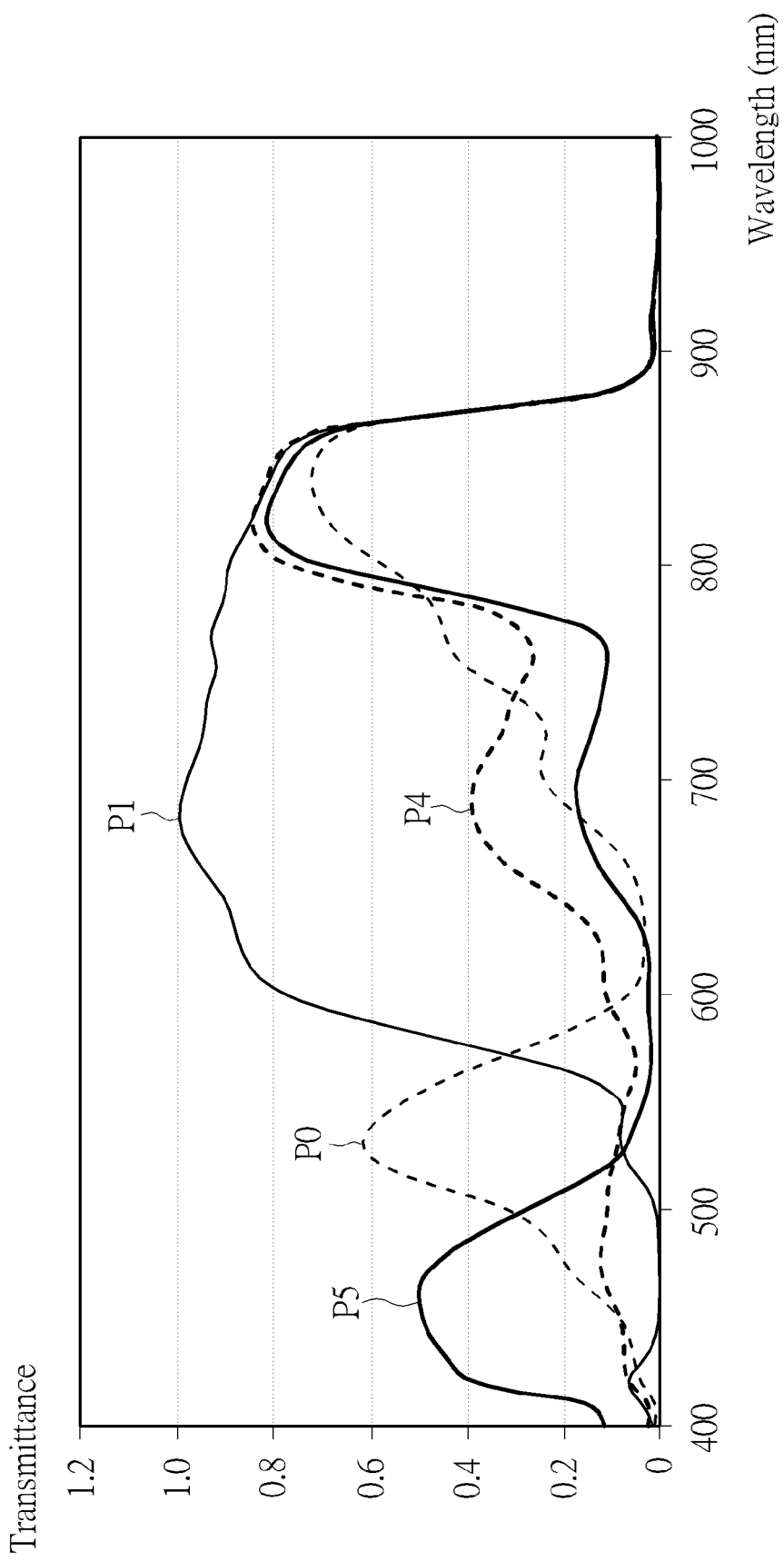
FIG. 16 is a diagram illustrating respective relationships between a wavelength of incident light and a light transmittance of the pixels shown in FIG. 9 according to an embodiment of the present invention.

Please refer to FIG. 16 in conjunction with FIG. 10, FIG. 11 and FIG. 14. FIG. 16 is a diagram illustrating respective relationships between a wavelength of incident light and a light transmittance of the pixels P0, P1, P4 and P5 shown in FIG. 9 according to an embodiment of the present invention, wherein a sensor spectrum of each pixel may be determined according to a corresponding photodetector sensitivity spectrum shown in FIG. 11, a corresponding filter sensitivity spectrum shown in FIG. 10 and the sensitivity spectrum of the coating layer 1332 shown in FIG. 14. As shown in FIG. 10 and FIG. 14, a transmission range of each filter may include the specific IR cut-off wavelength range shown in FIG. 14, and an IR detection wavelength range of each pixel may be determined accordingly. Additionally, the IR light generating device 602 shown in FIG. 6 may refer to the determined IR detection wavelength range to emit IR light of a corresponding wavelength.

Figure 17:
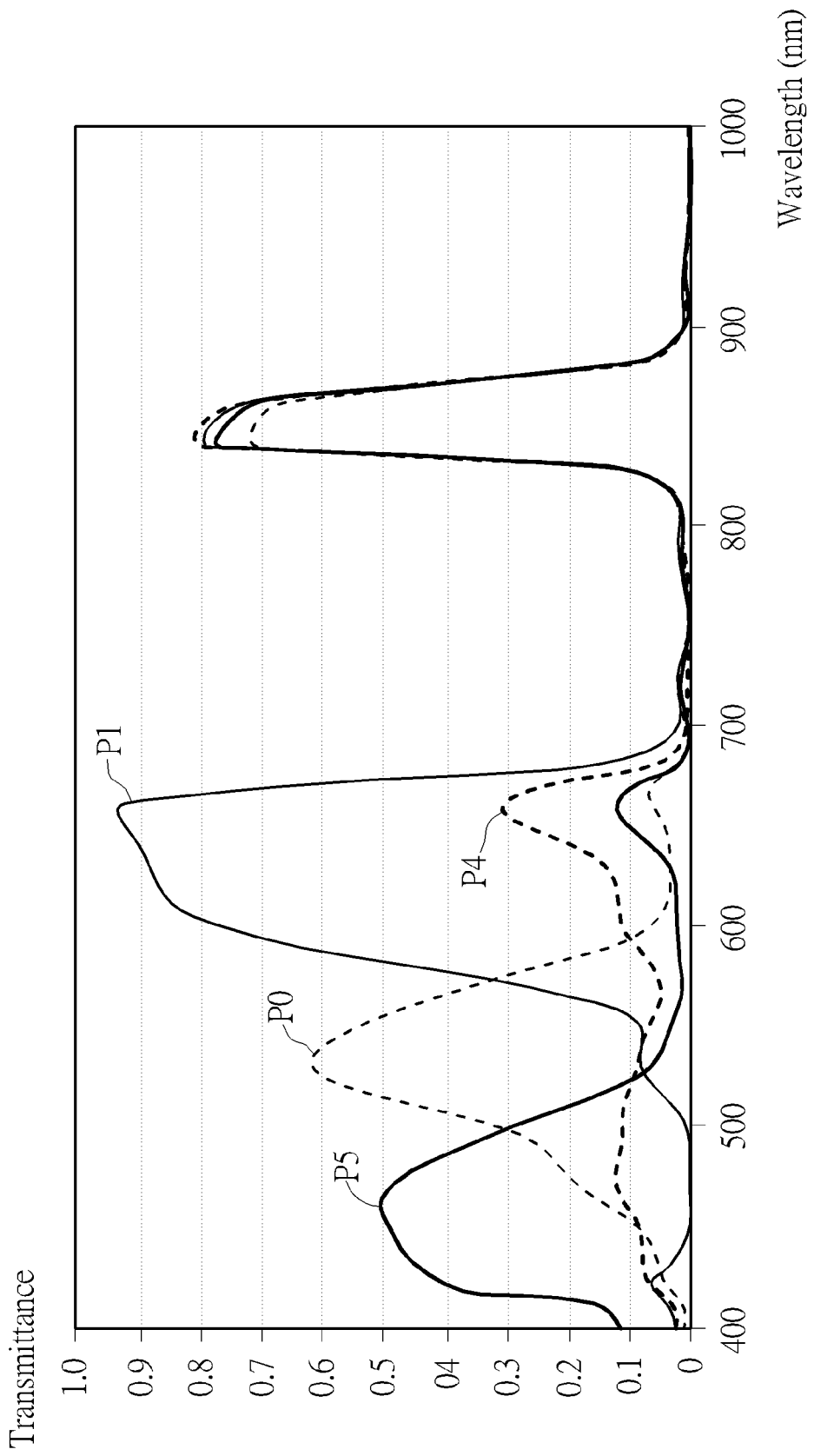
FIG. 17 is a diagram illustrating respective relationships between a wavelength of incident light and a light transmittance of the pixels shown in FIG. 9 according to another embodiment of the present invention.

Please refer to FIG. 17 in conjunction with FIG. 10, FIG. 11 and FIG. 15. FIG. 17 is a diagram illustrating respective relationships between a wavelength of incident light and a light transmittance of the pixels P0, P1, P4 and P5 shown in FIG. 9 according to another embodiment of the present invention, wherein a sensor spectrum of each pixel may be determined according to a corresponding photodetector sensitivity spectrum shown in FIG. 11, a corresponding filter sensitivity spectrum shown in FIG. 10 and the sensitivity spectrum of the coating layer 1332 shown in FIG. 15. As shown in FIG. 10 and FIG. 15, a transmission range of each filter may include the specific IR pass wavelength range shown in FIG. 15, and an IR detection wavelength range of each pixel may be determined accordingly. The IR light generating device 602 shown in FIG. 6 may refer to the determined IR detection wavelength range to emit IR light of a corresponding wavelength.

Please note that the sensitivity spectrums shown in FIG. 10-FIG. 12 and FIG. 14-FIG. 17 are for illustrative purposes only, and are not meant to be limitations of the present invention.

Figure 6:
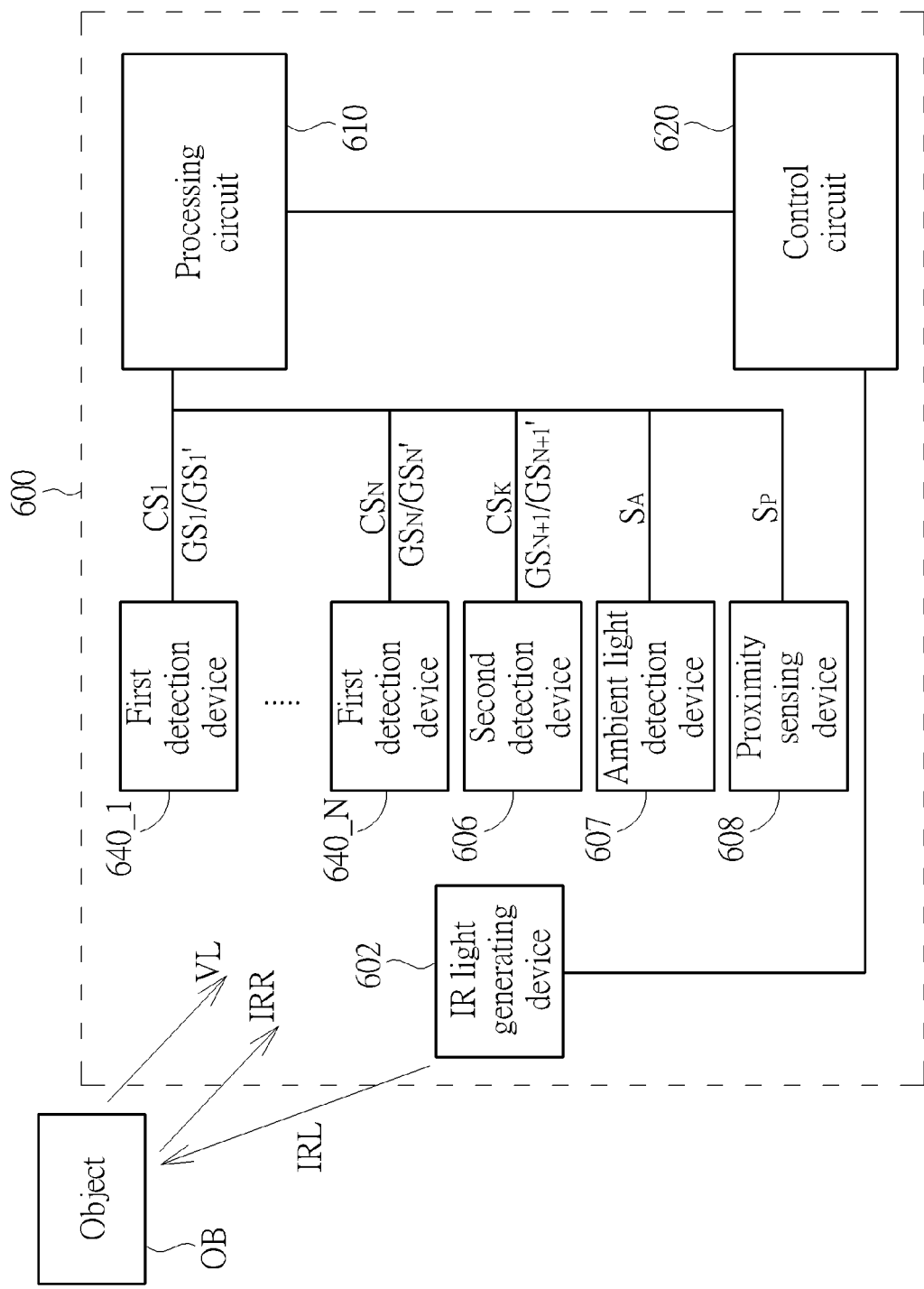
FIG. 6 is a block diagram illustrating an exemplary optical sensor apparatus according to an embodiment of the present invention.
Figure 18:
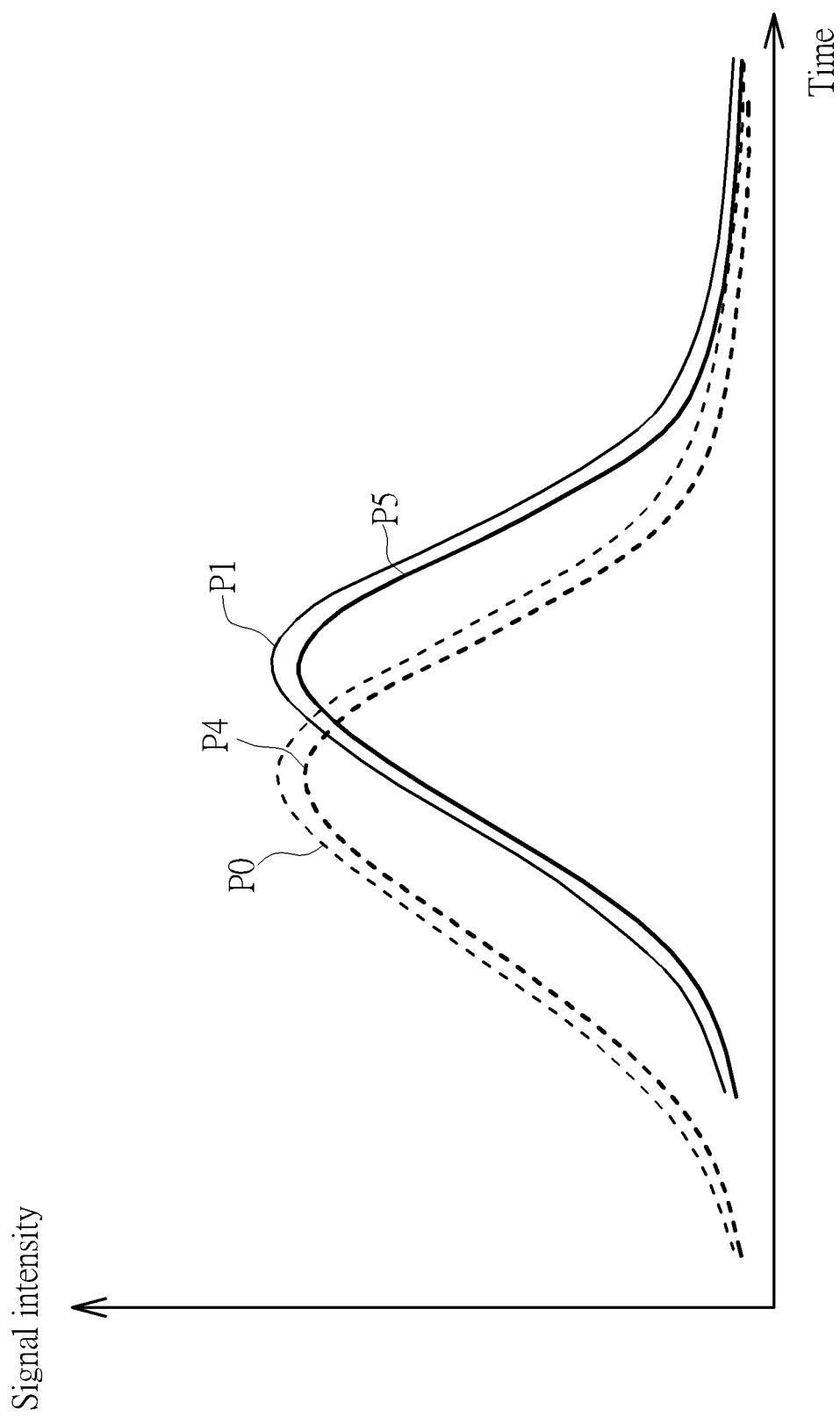
FIG. 18 is a diagram illustrating a relationship between detection signal intensity and time of the pixels shown in FIG. 8 in the gesture recognition mode according to an embodiment of the present invention.

Please refer to FIG. 18 in conjunction with FIG. 6 and FIG. 8. FIG. 18 is a diagram illustrating a relationship between detection signal intensity and time of the pixels P0, P1, P4 and P5 shown in FIG. 8 in the gesture recognition mode according to an embodiment of the present invention. In this embodiment, the detection signal intensity of each pixel corresponds to a signal difference between a detection signal generated when the IR light generating device 602 is activated and another detection signal generated when the IR light generating device 602 is deactivated. When the user waves his/her hand from left to right (e.g. the object OB moves from the pixel P0/P4 to the pixel P1/P5; not shown in FIG. 8), a signal waveform shown in FIG. 8 may be obtained. The processing circuit 610 may recognize the gesture information of the object OB by performing a cross correlation operation upon respective signal differences of the pixels P0, P1, P4 and P5. For example, the processing circuit 610 may perform the cross correlation operation upon the detection signal intensity corresponding to the pixels P0, P1, P4 and P5 to obtain time information (about when corresponding signal waveforms overlap) and signal correlation (e.g. an occurrence sequence of signal peaks), thereby determining movement information of the object OB (e.g. direction and distance of movement). Hence, the gesture information of the object OB may be recognized. As a person skilled in the art should understand operations of the cross correlation, further description is omitted here for brevity.

Figure 19:
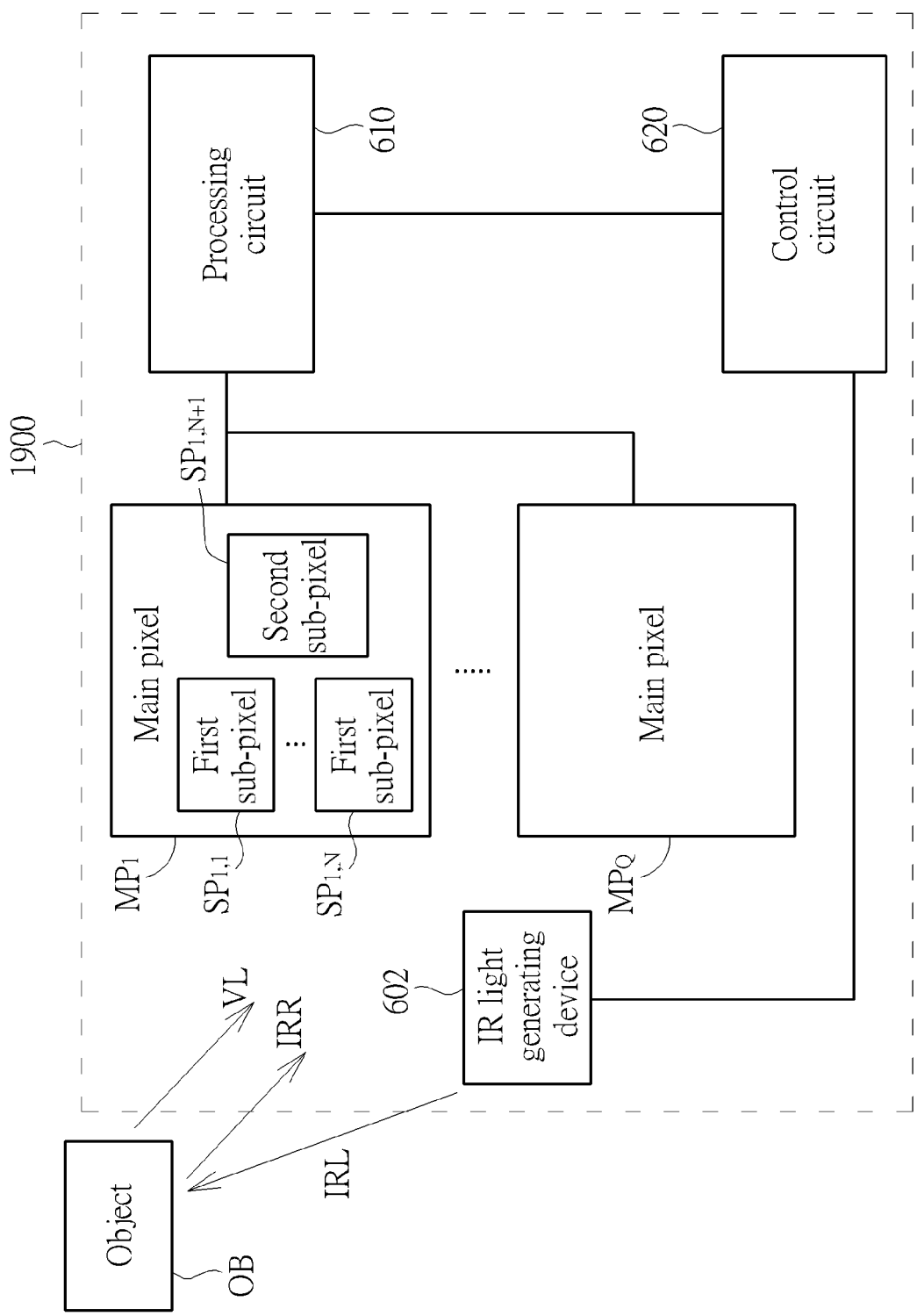
FIG. 19 is a block diagram illustrating an exemplary image sensing apparatus according to an embodiment of the present invention.

The proposed multi-purpose detection device may be used to implement an image sensing apparatus. Please refer to FIG. 19, which is a block diagram illustrating an exemplary image sensing apparatus according to an embodiment of the present invention. The architecture of the image sensing apparatus 1900 is based on that of the optical sensor apparatus 600 shown in FIG. 6, wherein the main difference is the disposition of detection devices. As shown in FIG. 19, the image sensing apparatus 1900 may include, but is not limited to, the IR light generating device 602, the processing circuit 610 and the control circuit 620 shown in FIG. 6, and a plurality of main pixels $MP_1$-$MP_Q$ (Q is a positive integer). Each main pixel may include N first sub-pixels (e.g. N first sub-pixels $SP_{1,1}$-$SP_{1,N}$) and a second sub-pixel (e.g. the second sub-pixel $SP_{1,N+1}$), wherein N is a positive integer. The N first sub-pixels of each main pixel may be implemented by the N first detection devices 604_1-604_N shown in FIG. 6, and the second sub-pixel of each main pixel may be implemented by the second detection device 606 shown in FIG. 6.

As the main pixels $MP_1$-$MP_Q$ are disposed at different locations respectively (e.g. arranged in a pixel array) and each main pixel may detect color information, the image sensing apparatus 1900 may obtain image information of the object OB based on the principle of color sensing of the optical sensor apparatus 600. Additionally, as the main pixels $MP_1$-$MP_Q$ are disposed at different locations respectively and each main pixel may detect IR light, the image sensing apparatus 1900 may obtain depth information of the object OB based on the principle of gesture recognition of the optical sensor apparatus 600.

Please refer to FIG. 20 in conjunction with FIG. 19. FIG. 20 is an implementation of a pixel layout of the image sensing apparatus 1900 shown in FIG. 19 in different sensing modes. In this implementation, the main pixels $MP_1$-$MP_Q$ may be a pixel array; each main pixel may be a two by two array (N equals to three); the N first sub-pixels of each main pixel may be implemented by the pixels P0, P1 and P5 shown in FIG. 8 (i.e. a red sub-pixel, a green sub-pixel and a blue sub-pixel); and the second sub-pixel of each main pixel may be implemented by the pixel P4 shown in FIG. 8 (i.e. a dark/black sub-pixel). Ina case where the image sensing apparatus 1900 operates in a first sensing mode (e.g. an image sensing mode), the red, green, blue sub-pixels of each main pixel may generate corresponding detection signals in response to light coming from the object OB, and the dark/black pixel of each main pixel may generate a reference signal in response to the light coming from the object OB. The processing circuit 610 may obtain the image information according to the detection signal and the corresponding reference signal (e.g. a respective signal difference between the reference signal and each detection signal).

In a case where the image sensing apparatus 1900 operates in a second sensing mode (e.g. depth information sensing mode), each main pixel may detect light reflected from the object OB when the IR light generating device 602 is activated in order to generate a detection signal, and detect light reflected from the object OB when the IR light generating device 602 is deactivated in order to generate another detection signal. The processing circuit 610 may obtain the depth information of the object OB according to the detection signal generated when the IR light generating device 602 is activated and the another detection signal generated when the IR light generating device 602 is deactivated (e.g. a signal difference between the detection signal and the another detection signal).

For example, each sub-pixel of the main pixel $MP_1$ (i.e. the pixel P0/P1/P4/P5) may generate a first auxiliary signal by detecting the light coming from the object OB when the IR light generating device 602 is activated, and the processing circuit 610 may calculate first auxiliary signals generated by the pixels P0, P1, P4 and P5 (e.g. summing up or averaging the first auxiliary signals) to obtain a detection signal (corresponding to activation of the IR light generating device 602) of the main pixel $MP_1$. Additionally, each sub-pixel of the main pixel $MP_1$ (i.e. the pixel P0/P1/P4/P5) may generate a second auxiliary signal by detecting the light coming from the object OB when the IR light generating device 602 is deactivated, and the processing circuit 610 may calculate second auxiliary signals generated by the pixels P0, P1, P4 and P5 (e.g. summing up or averaging the second auxiliary signals) to obtain another detection signal (corresponding to deactivation of the IR light generating device 602) of the main pixel $MP_1$. Hence, the processing circuit 610 may calculate a distance between the object and the image sensing apparatus 1900 (i.e. depth) according to a signal difference between the detection signal and the another detection signal, wherein the signal difference is substantially proportional to the inverse square of the distance between the object and the image sensing apparatus 1900.

In an alternative design, the IR light signal IRL emitted by the IR light generating device 602 may have a predetermined pattern. The processing circuit 610 may obtain a depth map image according to the signal difference between the detection signal and the another detection signal, and compare the predetermined pattern with the depth map image to obtain the depth information of the object OB. For example, the processing circuit 610 may calculate an offset between the predetermined pattern and the depth map image to generate offset information, thereby referring to the offset information to obtain the depth information of the object OB. As a person skilled in the art should understand that depth information of an object can be detected by emitting light having a predetermined pattern, further description is omitted here for brevity.

To sum up, the proposed optical sensing mechanism may integrate ambient light sensing, proximity sensing, color sensing and gesture recognition functions into a single sensor apparatus (or a single chip), wherein the minimum number of detection devices (or pixels) required may be four. In addition, the proposed optical sensing mechanism may be further employed in a pixel array to thereby realize a multi-function 3D image sensing apparatus.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical sensor apparatus, comprising:
an infrared light generating device;
N first detection devices, wherein each of the N first detection devices is arranged for detecting infrared light and visible light, the N first detection devices are arranged for detecting N different visible wavelength ranges, respectively, and N is a positive integer;
a second detection device, for detecting the infrared light, wherein the second detection device is optically shielded from the visible light; and
a processing circuit, coupled to the N first detection devices and the second detection device, wherein in a first sensing mode, the N first detection devices generate N first detection signals in response to light coming from an object, the second detection device generates a reference signal in response to the light coming from the object, and the processing circuit obtains color information according to the N first detection signals and the reference signal; and in a second sensing mode, the N first detection devices and the second detection device generate (N+1) second detection signals by detecting light coming from the object when the infrared light generating device is activated, the N first detection devices and the second detection device generate (N+1) third detection signals by detecting light coming from the object when the infrared light generating device is deactivated, and the processing circuit recognizes gesture information according to the (N+1) second detection signals and the (N+1) third detection signals.

2. The optical sensor apparatus of claim 1, wherein in the first sensing mode, the processing circuit obtains the color information according to a respective signal difference between the reference signal and each of the N first detection signals.

3. The optical sensor apparatus of claim 1, wherein in the second sensing mode, the processing circuit recognizes the gesture information according to a respective signal difference between a second detection signal and a third detection signal generated by each of the N first detection devices and a signal difference between a second detection signal and a third detection signal generated by the second detection device.

4. The optical sensor apparatus of claim 3, wherein the processing circuit recognizes the gesture information by performing a cross correlation operation upon N signal differences corresponding to the N first detection devices and the signal difference corresponding to the second detection device.

5. The optical sensor apparatus of claim 1, wherein N is greater than or equal to three; and the N first detection devices comprise a sensing pixel arranged for detecting a red wavelength range, a sensing pixel arranged for detecting a green wavelength range, and a sensing pixel arranged for detecting a blue wavelength range.

6. The optical sensor apparatus of claim 1, wherein the second detection device is a dark pixel.

7. The optical sensor apparatus of claim 1, further comprising:
a substrate, wherein each of the second detection device and the N first detection devices comprises:
a photodetector, disposed on the substrate; and
a filter, disposed in correspondence with the photodetector, wherein the photodetector performs light detection through the filter;
wherein a transmission range of the filter of each of the N first detection devices comprises a visible wavelength range and an infrared wavelength range corresponding to the first detection device only, and a transmission range of the filter of the second detection device comprises an infrared wavelength range corresponding to the second detection device only.

8. The optical sensor apparatus of claim 7, further comprising:
a coating layer, disposed in correspondence with the N first detection devices and the second detection device, wherein the coating layer has a specific infrared cut-off wavelength range, and the transmission range of the filter of each of the second detection device and the N first detection devices comprises the specific infrared cut-off wavelength range;
wherein the photodetector of each of the second detection device and the N first detection devices performs the light detection through the corresponding filter and the coating layer.

9. The optical sensor apparatus of claim 7, further comprising:
a coating layer, disposed in correspondence with the N first detection devices and the second detection device, wherein the coating layer has a specific infrared pass wavelength range, and the transmission range of the filter of each of the second detection device and the N first detection devices comprises the specific infrared pass wavelength range;
wherein the photodetector of each of the second detection device and the N first detection devices performs the light detection through the corresponding filter and the coating layer.

10. The optical sensor apparatus of claim 1, wherein at least one of the N first detection devices is arranged for switchably detecting a green wavelength range and ambient light.

11. The optical sensor apparatus of claim 1, wherein at least one of the second detection device and the N first detection devices is switchably arranged for proximity sensing.

12. The optical sensor apparatus of claim 1, further comprising:
a third detection device, coupled to the processing circuit, the third detection device arranged for detecting ambient light to generate an ambient light detection signal.

13. The optical sensor apparatus of claim 1, further comprising:
a third detection device, coupled to the processing circuit, the third detection device arranged for detecting infrared light to generate a proximity sensing signal.

14. An image sensing apparatus, comprising:
an infrared light generating device;
a plurality of main pixels, wherein each of the main pixels comprises:

N first sub-pixels, wherein each of the N first sub-pixels is arranged for detecting infrared light and visible light, the N first sub-pixels are arranged for detecting N different visible wavelength ranges, respectively, and N is a positive integer; and a second sub-pixel, for detecting the infrared light, wherein the second sub-pixel is optically shielded from the visible light; and a processing circuit, coupled to the main pixels, wherein in a first sensing mode, the N first sub-pixels of each main pixel generate N first detection signals in response to light coming from an object, the second sub-pixel of each main pixel generates a reference signal in response to the light coming from the object, and the processing circuit obtains image information according to the N first detection signals of each main pixel and the reference signal generated by the second sub-pixel corresponding to the N first detection signals of each main pixel; and in a second sensing mode, each main pixel generates a second detection signal by detecting light coming from the object when the infrared light generating device is activated, each main pixel generates a third detection signal by detecting light coming from the object when the infrared light generating device is deactivated, and the processing circuit recognizes depth information according to the second detection signal and the third detection signal of each main pixel.

15. The image sensing apparatus of claim 14, wherein in the first sensing mode, the processing circuit obtains the image information according to a respective signal difference between the reference signal and each of the N first detection signals generated by each main pixel.

16. The image sensing apparatus of claim 14, wherein in the second sensing mode, the processing circuit recognizes the depth information according to a signal difference between the second detection signal and the third detection signal generated by each main pixel.

17. The image sensing apparatus of claim 14, wherein in the second sensing mode, the N first sub-pixels and the corresponding second sub-pixel of each main pixel generate (N+1) first auxiliary signals by detecting the light coming from the object when the infrared light generating device is activated, and generate (N+1) second auxiliary signals by detecting the light coming from the object when the infrared light generating device is deactivated; and the processing circuit calculates the (N+1) first auxiliary signals to obtain the second detection signal of a corresponding one of the main pixels, and calculates the (N+1) second auxiliary signals to obtain the third detection signal of a corresponding one of the main pixels.

18. The image sensing apparatus of claim 14, wherein in the second sensing mode, the infrared light generating device emits infrared light having a predetermined pattern, and the processing circuit obtains a depth map image according to a signal difference between the second detection signal and the third detection signal generated by each main pixel, and compares the predetermined pattern with the depth map image to obtain the depth information.

19. The image sensing apparatus of claim 14, wherein N is greater than or equal to three; the N first sub-pixels of each main pixel comprise a sensing pixel arranged for detecting a red wavelength range, a sensing pixel arranged for detecting a green wavelength range, and a sensing pixel arranged for detecting a blue wavelength range; and the second sub-pixel is a dark pixel.

20. The image sensing apparatus of claim 14, wherein N is equal to three; the N first sub-pixels and the second pixel of each main pixel are disposed in a two by two array; and the main pixels are a pixel array.

* * * * *